United States Patent
Agiwal et al.

(10) Patent No.: US 11,452,143 B2
(45) Date of Patent: Sep. 20, 2022

(54) APPARATUS AND METHOD OF RANDOM ACCESS PRECEDURE

(71) Applicant: Samsung Electronics Co., Ltd., Suwon-si (KR)

(72) Inventors: Anil Agiwal, Suwon-si (KR); Hyunjeong Kang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 13 days.

(21) Appl. No.: 17/147,302

(22) Filed: Jan. 12, 2021

(65) Prior Publication Data
US 2021/0219346 A1    Jul. 15, 2021

Related U.S. Application Data

(60) Provisional application No. 62/961,103, filed on Jan. 14, 2020.

(51) Int. Cl.
*H04W 74/08* (2009.01)
*H04W 56/00* (2009.01)

(52) U.S. Cl.
CPC ..... *H04W 74/0833* (2013.01); *H04W 56/001* (2013.01)

(58) Field of Classification Search
CPC ........... H04W 74/0833; H04W 56/001; H04W 72/1242
See application file for complete search history.

(56) References Cited

U.S. PATENT DOCUMENTS

| | | |
|---|---|---|
| 2017/0019930 A1 | 1/2017 | Lee et al. |
| 2017/0245292 A1 | 8/2017 | Agiwal et al. |
| 2019/0159175 A1* | 5/2019 | Islam ................... H04W 72/048 |
| 2019/0254077 A1* | 8/2019 | Sahlin ................... H04L 5/0028 |
| 2020/0008188 A1 | 1/2020 | Nam et al. |
| 2022/0086915 A1* | 3/2022 | Canonne-Velasquez ..................... H04W 74/0833 |

FOREIGN PATENT DOCUMENTS

| | | |
|---|---|---|
| KR | 10-2016-0132368 A | 11/2016 |
| WO | 2016159728 A1 | 10/2016 |

OTHER PUBLICATIONS

International Search Report of the International Searching Authority dated Mar. 26, 2021 in connection with International Application No. PCT/KR2020/019380, 3 pages.
OPPO, "On Channel Structure for 2-step RACH," R1-1910987, 3GPP TSG RAN WG1 #98bis, Chongqing, China, Oct. 14-20, 2019, 9 pages.

(Continued)

*Primary Examiner* — Kyaw Z Soe

(57) ABSTRACT

A communication method and system for converging a fifth generation (5G) communication system for supporting higher data rates beyond a fourth generation (4G) system with a technology for Internet of things (IoT) are provided. The communication method and system may be applied to intelligent services based on the 5G communication technology and the IoT-related technology, such as smart home, smart building, smart city, smart car, connected car, health care, digital education, smart retail, security and safety services. A method for performing a random access procedure in a wireless communication system is provided.

18 Claims, 27 Drawing Sheets

(56) References Cited

OTHER PUBLICATIONS

Sony, "Considerations on Channel Structure for Two-Step RACH," R1-1906848, 3GPP TSG RAN WG1 Meeting #97, Reno, USA, May 13-17, 2019, 4 pages.

ZTE Corporation et al., "Configuration aspects for 2-step RACH," R2-1913369, 3GPP TSG RAN WG2 Meeting #107bis, Chongqing, China, Oct. 14-18, 2019, 10 pages.

* cited by examiner

APPARATUS AND METHOD OF RANDOM ACCESS PRECEDURE

CROSS-REFERENCE TO RELATED APPLICATION

This application is based on and claims priority under 35 U.S.C. § 119 to U.S. Provisional Patent Application No. 62/961,103, filed on Jan. 14, 2020, in the USPTO, the disclosure of which is incorporated by reference herein in its entirety.

BACKGROUND

1. Field

The disclosure relates to an apparatus and a method of performing random access procedure.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G) system.

According to an embodiment of the present disclosure, a method performed by a terminal of a random access procedure for a small data transmission comprises receiving, from a base station, at least one synchronization signal block (SSB), identifying at least one preamble associated with the at least one SSB based on first information on a number of preambles per SSB and second information on a starting index, for one of a 4-step random access procedure or a 2-step random access procedure for the small data transmission, selecting a preamble from the identified at least one preamble corresponding to an SSB selected from the at least one SSB, and transmitting, to a base station, the selected preamble in a physical random access channel (PRACH) occasion corresponding to the selected SSB.

According to an embodiment of the present disclosure, a method performed by a base station of a random access procedure for a small data transmission comprises transmitting, to a terminal, at least one synchronization signal block (SSB) and receiving, from the terminal, a preamble for one of a 4-step random access procedure or a 2-step random access procedure for the small data transmission, in a physical random access channel (PRACH) occasion corresponding to an SSB among the at least one SSB, wherein at least one preamble associated with the at least one SSB is identified based on first information on a number of preambles per SSB and second information on a starting index for one of the 4-step random access procedure or the 2-step random access procedure for the small data transmission and the preamble corresponding to the SSB is selected from the at least one preamble.

According to an embodiment of the present disclosure, a terminal of a random access procedure for a small data transmission comprises a transceiver and a controller coupled with the transceiver and configured to control to receive, from a base station, at least one synchronization signal block (SSB), identify at least one preamble associated with the at least one SSB based on first information on a number of preambles per SSB and second information on a starting index, for one of a 4-step random access procedure or a 2-step random access procedure for the small data transmission, selecting a preamble from the identified at least one preamble corresponding to an SSB selected from the at least one SSB and transmit, to a base station, the selected preamble in a physical random access channel (PRACH) occasion corresponding to the selected SSB.

According to an embodiment of the present disclosure, a base station of a random access procedure for a small data transmission comprises a transceiver and a controller coupled with the transceiver and configured to control to transmit, to a terminal, at least one synchronization signal block (SSB), and receive, from the terminal, a preamble for one of a 4-step random access procedure or a 2-step random access procedure for the small data transmission, in a physical random access channel (PRACH) occasion corresponding to an SSB among the at least one SSB, wherein at least one preamble associated with the SSB is identified based on first information on a number of preambles per SSB and second information on a starting index for one of the 4-step random access procedure or the 2-step random access procedure for the small data transmission and the preamble corresponding to the SSB is selected from the at least one preamble.

Additional aspects will be set forth in part in the description which follows and, in part, will be apparent from the description, or may be learned by practice of the presented embodiments.

For random access procedure, upon receiving the random access preamble, gNB needs to identify whether the UE has initiated the random access for small data transmission or not. In an UL BWP, 4S RA (4-step random access) for SDT and/or 4S RA for Non SDT and/or 2S RA (2-step random access) for SDT and/or 2S RA for non SDT can be configured. ROs may or may not be shared between one or more of these RA types i.e., 4S RA for SDT, 4S RA for Non SDT, 2S RA for SDT, 2S RA for non SDT. The issue is how to determine which preambles/SSB/RO are used for 4S RA SDT and 2S RA SDT. Explicitly indicating each preamble index for each SSB/RO will lead to significant signaling overhead.

For sidelink communication, UE can be configured with both scheduled resource allocation (i.e., Mode 1) and autonomous resource allocation (i.e., Mode 2) scheduling modes. gNB indicates scheduling mode (Mode 1 or Mode 2) associated with each SL LCH. UE multiplexes SL LCH(s) associated with same scheduling mode in SL MAC PDU. This approach may lead to wastage of resources. Some mechanism to multiplex SL LCH associated with a scheduling mode in SL grant of another scheduling mode is needed.

The embodiments in this disclosure describe methods to determine preambles/SSB/RO are used for 4S RA SDT and 2S RA SDT for various RA configurations with minimum signaling overhead.

The embodiments in this disclosure also describe methods to multiplex SL LCH associated with a scheduling mode in SL grant of another scheduling mode to reduce resource wastage.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
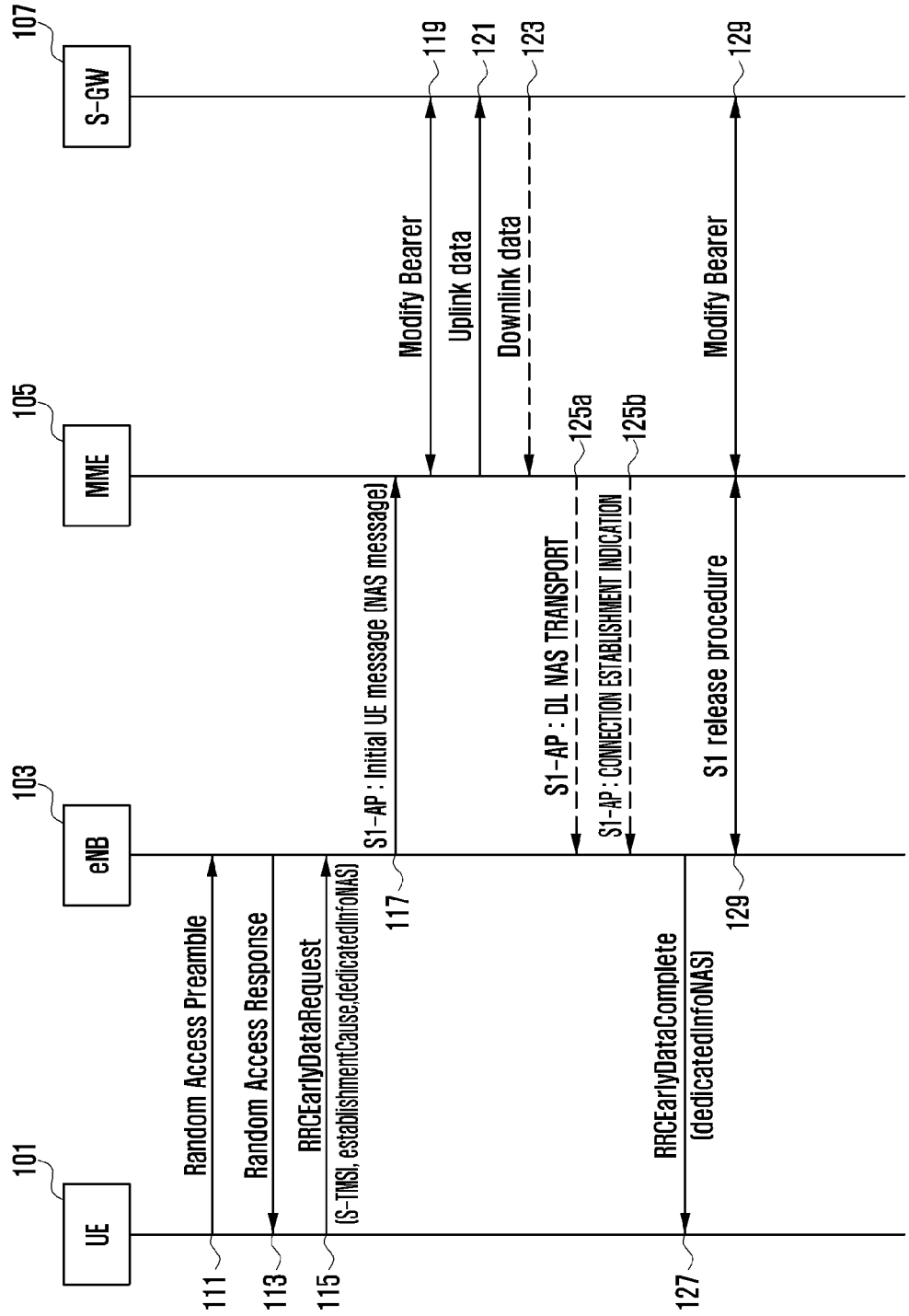
FIG. 1 shows the operation for explaining an example of early data transmission (EDT).
Figure 2:
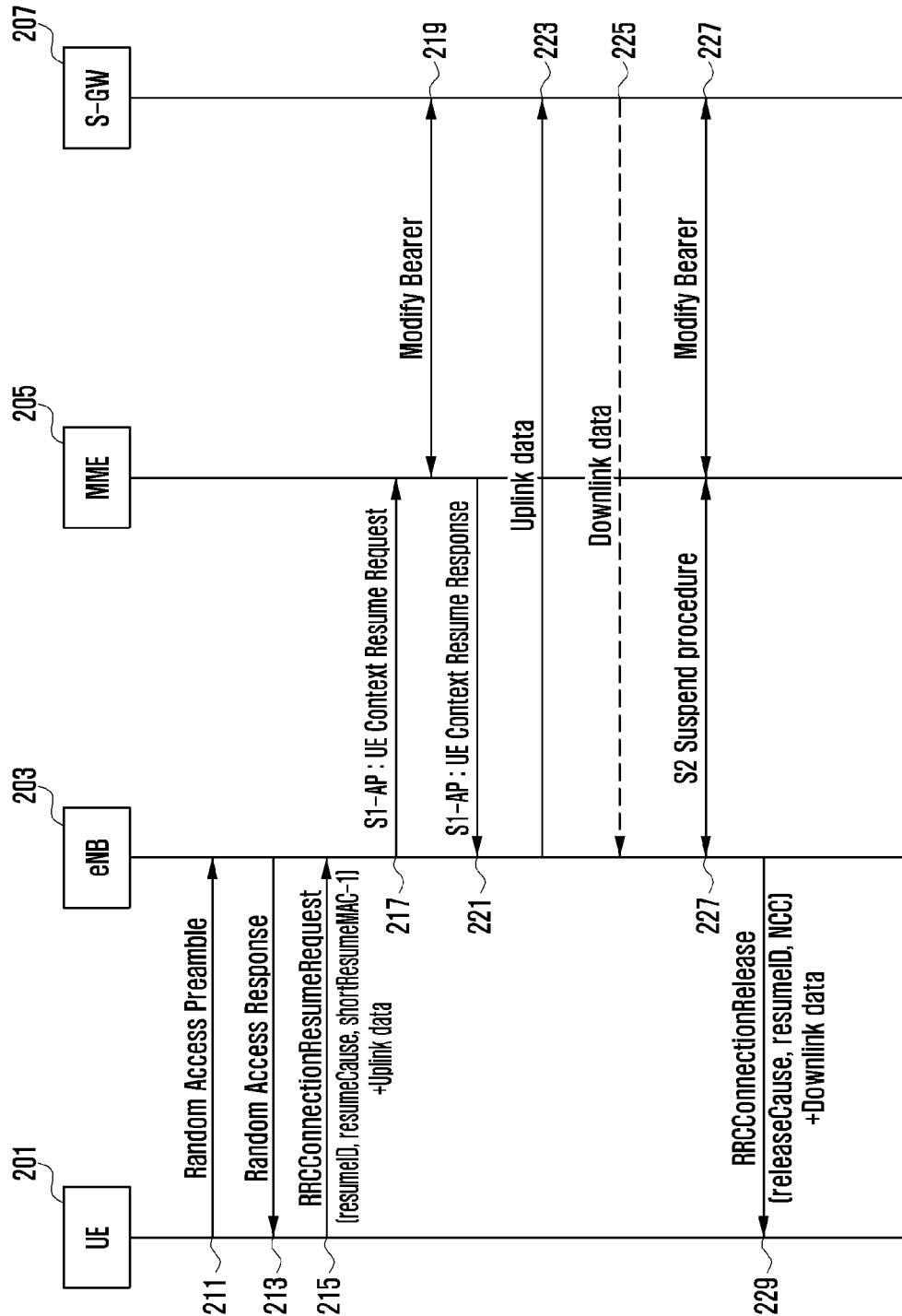
FIG. 2 shows the operation for explaining another example of EDT.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (B S)" is an entity communicating with a user equipment (UE) and may be referred to as BS, base transceiver station (BTS), node B (NB), evolved NB (eNB), access point (AP), fifth generation (5G) NB (5gNB), or next generation NB (gNB).

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So, fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. For example, use cases for the fifth generation wireless communication system wireless system are expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enablers for autonomous cars.

In the fifth generation wireless communication system operating in higher frequency (mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as receive (RX) beam.

The fifth generation wireless communication system supports standalone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in RRC_CONNECTED is configured to utilize radio resources provided by two distinct schedulers, located in two different nodes connected via a non-ideal backhaul and providing either E-UTRA (i.e., if the node is an ng-eNB) or NR access (i.e., if the node is a gNB). In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e., Special Cell) refers to the PCell of the MCG or the PSCell of the SCG, otherwise the term Special Cell refers to the PCell.

In the fifth generation wireless communication system, Physical Downlink Control Channel (PDCCH) is used to schedule DL transmissions on PDSCH and UL transmissions on PUSCH, where the Downlink Control Information (DCI) on PDCCH includes: Downlink assignments containing at least modulation and coding format, resource allocation, and hybrid-ARQ information related to DL-SCH; Uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the PRB(s) and OFDM symbol(s) where the UE may assume no transmission is intended for the UE; Transmission of TPC commands for PUCCH and PUSCH; Transmission of one or more TPC commands for SRS transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In fifth generation wireless communication system, a list of search space configurations is signaled by gNB for each configured BWP wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbol s-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot})\mod(\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of CORESET configuration associated with it. A list of CORESET configurations is signaled by gNB for each configured BWP wherein each CORESET configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS is pre-defined in NR. Each CORESET configuration is associated with a list of TCI (transmission configuration indicator) states. One DL RS ID (SSB or CSI RS) is configured per TCI state. The list of TCI states corresponding to a CORESET configuration is signaled by gNB via RRC signaling. One of the TCI state in TCI state list is activated and indicated to UE by gNB. TCI state indicates the DL TX beam (DL TX beam is QCLed with SSB/CSI RS of TCI state) used by gNB for transmission of PDCCH in the PDCCH monitoring occasions of a search space.

In fifth generation wireless communication system bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e., it does not have to monitor PDCCH on the entire DL frequency of the serving cell. In RRC connected state, UE is configured with one or more DL and UL BWPs, for each configured Serving Cell (i.e., PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in RRC CONNECTED state. Several types of random access procedure are supported.

Contention Based Random Access (CBRA)

This is also referred as 4 step CBRA. In this type of random access, UE first transmits Random Access preamble (also referred as Msg1) and then waits for Random access response (RAR) in the RAR window. RAR is also referred as Msg2. Next generation node B (gNB) transmits the RAR on physical downlink shared channel (PDSCH). PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=1+s_id+14*t_id+14*80*f_id+14*80*8*ul_carrier_id, where s_id is the index of the first orthogonal frequency division multiplexing (OFDM) symbol of the PRACH occasion where UE has transmitted Msg1, i.e. RA preamble; $0 \le s\_id<14$; t_id is the index of the first slot of the PRACH occasion ($0 \le t\_id<80$); f_id is the index of the PRACH occasion within the slot in the frequency domain ($0 \le f\_id<8$), and ul_carrier_id is the UL carrier used for Msg1 transmission (0 for normal UL (NUL) carrier and 1 for supplementary UL (SUL) carrier. Several RARs for various Random access preambles detected by gNB can be multiplexed in the same RAR media access control (MAC) protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e., select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e., cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a physical downlink control channel (PDCCH) addressed to C-RNTI included in Msg3, contention resolution is considered successful, contention resolution timer is stopped and RA procedure is completed. While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to first step i.e., select random access resource (preamble/RACH occasion) and transmits the RA preamble. A backoff may be applied before going back to first step.

PRACH occasions (or ROs) for 4 step PRACH preamble transmission are indicated by parameter prach-ConfigIndex. SS/PBCH blocks (SSBs) are mapped to valid PRACH occasions in the following order:

First, in increasing order of preamble indexes within a single PRACH occasion

Second, in increasing order of frequency resource indexes for frequency multiplexed PRACH occasions Third, in increasing order of time resource indexes for time multiplexed PRACH occasions within a PRACH slot Fourth, in increasing order of indexes for PRACH slots For paired spectrum or supplementary uplink band all PRACH occasions are valid.

For unpaired spectrum, if a UE is not provided tdd-UL-DL-ConfigurationCommon, a PRACH occasion in a PRACH slot is valid if it does not precede a SS/PBCH block in the PRACH slot and starts at least $N_{gap}$ symbols after a last SS/PBCH block reception symbol, where $N_{gap}$ is provided in Table 8.1-2.

If a UE is provided tdd-UL-DL-ConfigurationCommon, a PRACH occasion in a PRACH slot is valid if it is within UL symbols, or it does not precede a SS/PBCH block in the PRACH slot and starts at least $N_{gap}$ symbols after a last downlink symbol and at least $N_{gap}$ symbols after a last SS/PBCH block symbol, where $N_{gap}$ is 0 for preamble SCS of 1.25 KHz and 5 KHz, $N_{gap}$ is 2 for preamble SCS of 15 KHz, 30 KHz, 60 KHz and 120 KHz.

An association period, starting from frame 0, for mapping SS/PBCH blocks to SSB PRACH occasions is the period such that $N_{Tx}^{SSB}$ SS/PBCH blocks are mapped at least once to the PRACH occasions within the association period, where a UE obtains $N_{Tx}^{SSB}$ from the value of ssb-PositionsInBurst in SIB1 or in ServingCellConfigCommon. An association pattern period includes one or more association periods and is determined so that a pattern between PRACH occasions and SS/PBCH blocks repeats at most every 160 msec.

For 4 step CBRA, if N<1, one SS/PBCH block is mapped to 1/N consecutive valid PRACH occasions and R contention based preambles with consecutive indexes associated with the SS/PBCH block per valid PRACH occasion start from zero, where N is number of SSBs per PRACH occasion and R is number of contention based preambles per SSB for 4 step CBRA. If N≥1, R contention based preambles with consecutive indexes associated with SS/PBCH block n, 0≤n≤N−1, per valid PRACH occasion start from preamble index $n \cdot N_{preamble}^{total}/N$ where $N_{preamble}^{total}$ preamble is provided by totalNumberOfRA-Preambles, and is an integer multiple of N.

Contention Free Random Access (CFRA)

This is also referred as legacy CFRA or 4 step CFRA. CFRA procedure is used for scenarios such as handover where low latency is required, timing advance establishment for secondary cell (Scell), etc. Evolved node B (eNB) assigns to UE dedicated Random access preamble. UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA is considered successfully completed after receiving the RAR including RA preamble identifier (RAPID) of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access i.e., during random access resource selection for Msg1 transmission UE determines whether to transmit dedicated preamble or non dedicated preamble. Dedicated preambles are typically provided for a subset of SSBs/CSI RSs. If there is no SSB/CSI RS having DL RSRP above a threshold amongst the SSBs/CSI RSs for which contention free random access resources (i.e., dedicated preambles/ROs) are provided by gNB, UE select non dedicated preamble. Otherwise, UE select dedicated preamble. So, during the RA procedure, one random access attempt can be CFRA while other random access attempt can be CBRA.

2 Step Contention Based Random Access (2 Step CBRA)

In the first step, UE transmits random access preamble on PRACH and a payload (i.e., MAC PDU) on PUSCH. The random access preamble and payload transmission is also referred as MsgA. In the second step, after MsgA transmission, the UE monitors for a response from the network (i.e., gNB) within a configured window. The response is also referred as MsgB. If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e., upon transmitting Msg3), UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the msgA configurable number of times, UE fallbacks to 4 step RACH procedure i.e., UE only transmits the PRACH preamble.

MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. MsgA may include UE ID (e.g., random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g., in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g., one or more DL TX beam ID(s) or SSB ID(s)), beam failure recovery indication/information, data indicator, cell/BS/TRP switching indication, connection re-establishment indication, reconfiguration complete or handover complete message, etc.

For 2 step CBRA, SS/PBCH blocks (SSBs) are mapped to valid PRACH occasions in same manner as 4 step CBRA.

2 Step Contention Free Random Access (2 Step CFRA)

In this case gNB assigns to UE dedicated Random access preamble (s) and PUSCH resource(s) for MsgA transmission. RO(s) to be used for preamble transmission may also be indicated. In the first step, UE transmits random access preamble on PRACH and a payload on PUSCH using the contention free random access resources (i.e., dedicated preamble/PUSCH resource/RO). In the second step, after MsgA transmission, the UE monitors for a response from the network (i.e., gNB) within a configured window. If UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access i.e., during random access resource selection for MsgA transmission UE determines whether to transmit dedicated preamble or non dedicated preamble. Dedicated preambles are typically provided for a subset of SSBs/CSI RSs. If there is no SSB/CSI RS having DL RSRP above a threshold amongst the SSBs/CSI RSs for which contention free random access resources (i.e., dedicated preambles/ROs/PUSCH resources) are provided by gNB, UE select non dedicated preamble. Otherwise, UE select dedicated preamble. So, during the RA procedure, one random access attempt can be 2 step CFRA while other random access attempt can be 2 step CBRA.

Upon initiation of random access procedure, UE first selects the carrier (SUL or NUL). If the carrier to use for the Random Access procedure is explicitly signaled by gNB, UE select the signaled carrier for performing Random Access procedure. If the carrier to use for the Random Access procedure is not explicitly signaled by gNB; and if the Serving Cell for the Random Access procedure is configured with supplementary uplink and if the RSRP of the downlink pathloss reference is less than rsrp-Threshold-SSB-SUL: UE select the SUL carrier for performing Random Access procedure. Otherwise, UE select the NUL carrier for performing Random Access procedure. Upon selecting the UL carrier, UE determines the UL and DL BWP for random access procedure as specified in section 5.15 of TS 38.321. UE then determines whether to perform 2 step or 4 step RACH for this random access procedure.

- If this random access procedure is initiated by PDCCH order and if the ra-PreambleIndex explicitly provided by PDCCH is not 0b000000, UE selects 4 step RACH.
- else if 2 step contention free random access resources are signaled by gNB for this random access procedure, UE selects 2 step RACH.
- else if 4 step contention free random access resources are signaled by gNB for this random access procedure, UE selects 4 step RACH.
- else if the UL BWP selected for this random access procedure is configured with only 2 step RACH resources, UE selects 2 step RACH.
- else if the UL BWP selected for this random access procedure is configured with only 4 step RACH resources, UE selects 4 step RACH.
- else if the UL BWP selected for this random access procedure is configured with both 2 step and 4 step RACH resources, if RSRP of the downlink pathloss reference is below a configured threshold, UE selects 4 step RACH. Otherwise, UE selects 2 step RACH.

In the fifth generation wireless communication system, node B (gNB) or base station in cell broadcast Synchronization Signal and PBCH block (SSB) consists of primary and secondary synchronization signals (PSS, SSS) and system information. System information includes common parameters needed to communicate in cell. In the fifth generation wireless communication system (also referred as next generation radio or NR), System Information (SI) is divided into the MIB and a number of SIBs where:

- the MIB is always transmitted on the BCH with a periodicity of 80 milliseconds (ms) and repetitions made within 80 ms and it includes parameters that are needed to acquire SIB1 from the cell.
- the SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in SIB 1 includes mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (PRACH preamble(s) and PRACH resource(s)) for requesting gNB to broadcast one or more SI message(s).
- SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB 1. The cell specific SIB is applicable only within a cell that provides the SIB while the area specific SIB is applicable within an area referred to as SI area, which consists of one or several cells and is identified by systemInformation-AreaID.

UE acquires SIB 1 from the camped or serving cell. UE check the BroadcastStatus bit in SIB 1 for SI message which UE needs to acquire. SI request configuration for SUL is signaled by gNB using the IE si-RequestConfigSUL in SIB1. If the IE si-RequestConfigSUL is not present in SIB1, UE considers that SI request configuration for SUL is not signaled by gNB. SI request configuration for NUL is signaled by gNB using the IE si-RequestConfig in SIB1. If the IE si-RequestConfig is not present in SIB1, UE considers that SI request configuration for NUL is not signaled by gNB. If SI message which UE needs to acquire is not being broadcasted (i.e., BroadcastStatus bit is set to zero), UE initiates transmission of SI request. The procedure for SI request transmission is as follows:

If SI request configuration is signaled by gNB for SUL, and criteria to select SUL is met (i.e., RSRP derived from SSB measurements of camped or serving cell<rsrp-ThresholdSSB-SUL, where rsrp-ThresholdSSB-SUL is signaled by gNB (e.g., in broadcast signaling such as SIB1)): UE initiate transmission of SI request based on Msg1 based SI request on SUL. In other words, UE initiates Random Access procedure using the PRACH preamble(s) and PRACH resource(s) in SI request configuration of SUL. UE transmits Msg1 (i.e., Random access preamble) and waits for acknowledgement for SI request. Random access resources (PRACH preamble(s) and PRACH occasions(s)) indicated in SI request configuration of SUL is used for Msg1. Msg1 is transmitted on SUL. If acknowledgement for SI request is received, UE monitors the SI window of the requested SI message in one or more SI period(s) of that SI message.

Else if SI request configuration is signaled by gNB for NUL and criteria to select NUL is met (i.e., NUL is selected if SUL is supported in camped or serving cell and RSRP derived from SSB measurements of camped or serving cell>=rsrp-ThresholdSSB-SUL; OR NUL is selected if SUL is not supported in serving cell): UE initiate transmission of SI request based on Msg1 based SI request on NUL (350). In other words, UE initiates Random Access procedure using the PRACH preamble(s) and PRACH resource(s) in SI request configuration of NUL. UE transmits Msg1 (i.e., Random access preamble) and waits for acknowledgement for SI request. Random access resources (PRACH preamble(s) and PRACH occasions(s)) indicated in SI request configuration of NUL is used for Msg1. Msg1 is transmitted on NUL. If acknowledgement for SI request is received, UE monitors the SI window of the requested SI message in one or more SI period(s) of that SI message.

Else UE initiate transmission of SI request based on Msg3 based SI request. In other words, UE initiate transmission of RRCSystemInfoRequest message (345). UE transmits Msg1 (i.e., Random access preamble) and waits for random access response. Common random access resources (PRACH preamble(s) and PRACH occasions(s)) are used for Msg1. In the UL grant received in random access response, UE transmits RRCSystemInfoRequest message and waits for acknowledgement for SI request (i.e., RRCSystemInfoRequest message). If acknowledgement for SI request (i.e., RRCSystemInfoRequest message) is received, UE monitors the SI window of the requested SI message in one or more SI period(s) of that SI message. Note that if SUL is configured, UL carrier for Msg1 transmission will be selected by UE in similar manner as selected by UE for Msg1 based SI request. SUL is the selected UL carrier, if RSRP derived from SSB measurements of camped or serving cell<rsrp-ThresholdSSB-SUL where rsrp-ThresholdSSB-SUL is signaled by gNB (e.g., in broadcast signaling such as SIB1). NUL is the selected UL carrier, if RSRP derived from SSB measurements of camped or serving cell>=rsrp-ThresholdSSB-SUL where rsrp-ThresholdSSB-SUL is signaled by gNB (e.g., in broadcast signaling such as SIB1).

4G wireless communication system supports early data transmission (EDT). EDT allows one uplink data transmission optionally followed by one downlink data transmission during the random access procedure. EDT is triggered when the upper layers have requested the establishment or resumption of the RRC Connection for Mobile Originated data (i.e., not signaling or SMS) and the uplink data size is less than or equal to a TB size indicated in the system information.

In one approach of EDT, uplink user data are transmitted in a NAS message concatenated in UL RRCEarlyDataRequest message on CCCH. Downlink user data are optionally transmitted in a NAS message concatenated in DL RRCEarlyDataComplete message on CCCH. There is no transition to RRC CONNECTED. The detailed procedure (see FIG. 1) is as follows:

Steps 111-113. Upon connection establishment request for Mobile Originated data from the upper layers, the UE (101) initiates the early data transmission procedure and selects a random access preamble configured for EDT.

Step 115. UE sends RRCEarlyDataRequest message concatenating the user data on CCCH.

Step 117. The eNB (103) initiates the S1-AP Initial UE message procedure to forward the NAS message and establish the S1 connection. The eNB may indicate in this procedure that this connection is triggered for EDT.

Step 119. The MME (105) requests the S-GW (107) to re-activate the EPS bearers for the UE.

Step 121. The MME sends the uplink data to the S-GW.

Step 123. If downlink data are available, the S-GW sends the downlink data to the MME.

Steps 125a-125b. If downlink data are received from the S-GW, the MME forwards the data to the eNB via DL NAS Transport procedure and may also indicate whether further data are expected. Otherwise, the MME may trigger Connection Establishment Indication procedure and also indicate whether further data are expected.

Step 127. If no further data are expected, the eNB can send the RRCEarlyDataComplete message on CCCH to keep the UE in RRC_IDLE. If downlink data were received in step 6, they are concatenated in RRCEarlyDataComplete message.

Step 129. The S1 connection is released and the EPS bearers are deactivated.

NOTE: If the MME or the eNB decides to move the UE in RRC_CONNECTED mode, RRCConnectionSetup message is sent in step 7 to fall back to the legacy RRC Connection establishment procedure; the eNB will discard the zero-length NAS PDU received in msg5.

In another approach of EDT, the UE has been provided with a NextHopChainingCount in the RRCConnectionRelease message with suspend indication. Uplink user data are transmitted on DTCH multiplexed with UL RRCConnectionResumeRequest message on CCCH. Downlink user data are optionally transmitted on DTCH multiplexed with DL RRCConnectionRelease message on DCCH. The short resume MAC-I is reused as the authentication token for RRCConnectionResumeRequest message and is calculated using the integrity key from the previous connection. The user data in uplink and downlink are ciphered. The keys are derived using the NextHopChainingCount provided in the RRCConnectionRelease message of the previous RRC connection. The RRCConnectionRelease message is integrity protected and ciphered using the newly derived keys. There is no transition to RRC CONNECTED. The detailed procedure (see FIG. 2) is as follows:

Steps 211-213. Upon connection resumption request for Mobile Originated data from the upper layers, the UE (201) initiates the early data transmission procedure and selects a random access preamble configured for EDT.

Step 215. The UE sends an RRCConnectionResumeRequest to the eNB (203), including its Resume ID, the establishment cause, and an authentication token. The UE resumes all SRBs and DRBs, derives new security keys using the NextHopChainingCount provided in the RRCConnectionRelease message of the previous connection and re-establishes the AS security. The user data are ciphered and transmitted on DTCH multiplexed with the RRCConnectionResumeRequest message on CCCH.

Step 217. The eNB initiates the S1-AP Context Resume procedure to resume the S1 connection and re-activate the S1-U bearers.

Step 219. The MME (205) requests the S-GW (207) to re-activate the S1-U bearers for the UE.

Step 221. The MME confirms the UE context resumption to the eNB.

Step 223. The uplink data are delivered to the S-GW.

Steps 225. If downlink data are available, the S-GW sends the downlink data to the eNB.

Step 227. If no further data are expected from the S-GW, the eNB can initiate the suspension of the S1 connection and the deactivation of the S1-U bearers.

Step 229. The eNB sends the RRCConnectionRelease message to keep the UE in RRC_IDLE. The message includes the releaseCause set to rrc-Suspend, the resumeID, the NextHopChainingCount and drb-ContinueROHC which are stored by the UE. If downlink data were received in step 6, they are sent ciphered on DTCH multiplexed with the RRCConnectionRelease message on DCCH.

NOTE: If the MME or eNB decides the UE to move in RRC_CONNECTED mode, RRCConnectionResume message is sent in step 7 to fall back to the RRC Connection resume procedure. In that case, the RRCConnectionResume message is integrity protected and ciphered with the keys derived in step 1 and the UE ignores the NextHopChainingCount included in the RRCConnectionResume message. Downlink data can be transmitted on DTCH multiplexed with the RRCConnectionResume message.

4G and 5G wireless communication system supports vehicular communication services. Vehicular communication services, represented by V2X services, can consist of the following four different types: V2V, V2I, V2N and V2P. In fifth generation (also referred as NR or New Radio) wireless communication system, V2X communication is being enhanced to support enhanced V2X use cases, which are broadly arranged into four use case groups:

1) Vehicles Platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced Driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.

4) Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

Figure 3:
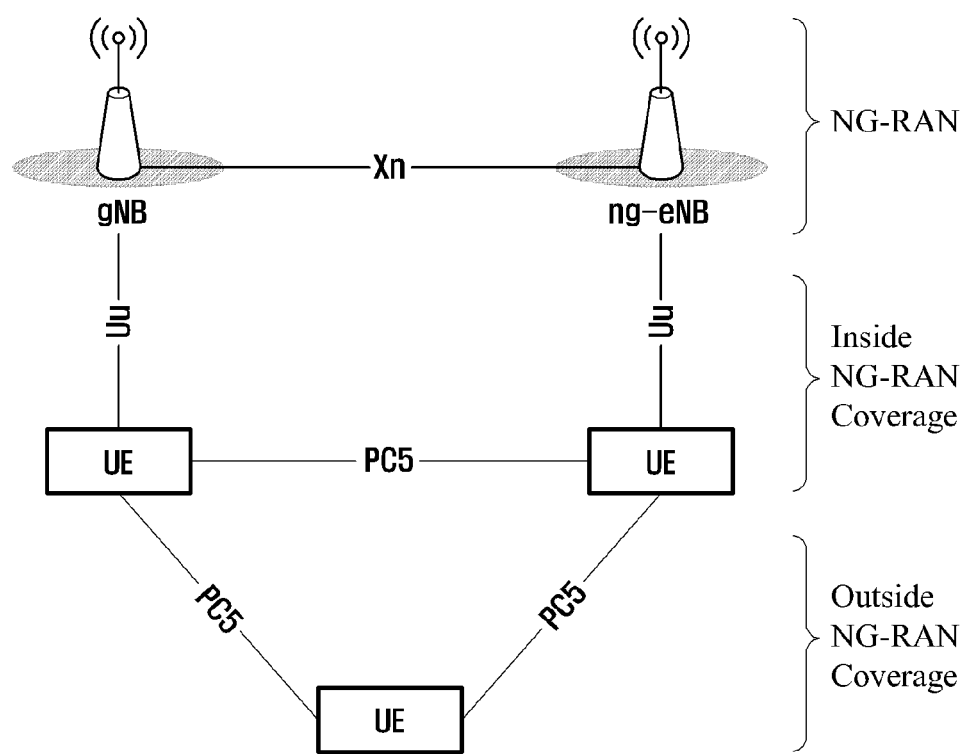
FIG. 3 illustrates NG-RAN architecture supporting PC5 interface.

Referring to FIG. 3, V2X services can be provided by PC5 interface and/or Uu interface. Support of V2X services via PC5 interface is provided by NR sidelink communication or V2X sidelink communication, which is a mode of communication whereby UEs can communicate with each other directly over the PC5 interface using NR technology or EUTRA technology respectively without traversing any network node. This communication mode is supported when the UE is served by RAN and when the UE is outside of RAN coverage. Only the UEs authorized to be used for V2X services can perform NR or V2X sidelink communication. The NG-RAN architecture supports the PC5 interface as illustrated in FIG. 3. Sidelink transmission and reception over the PC5 interface are supported when the UE is inside NG-RAN coverage, irrespective of which RRC state the UE is in, and when the UE is outside NG-RAN coverage. Support of V2X services via the PC5 interface can be provided by NR Sidelink Communication and/or V2X Sidelink Communication. NR Sidelink Communication may be used to support other services than V2X services.

NR or V2X Sidelink Communication can support multiple types of transmission modes. unicast transmission, characterized by support of at least one PC5-RRC connection between peer UEs; transmission and reception of control information and user traffic between peer UEs in sidelink; support of sidelink HARQ feedback; support of RLC AM; and support of sidelink RLM for both peer UEs to detect RLF. Groupcast transmission, characterized by: transmission and reception of user traffic among UEs belonging to a group in sidelink; support of sidelink HARQ feedback. Broadcast transmission, characterized by: Transmission and reception of user traffic among UEs in sidelink.

The AS protocol stack for the control plane in the PC5 interface consists of RRC, PDCP, RLC and MAC sublayer, and the physical layer. The AS protocol stack for user plane in the PC5 interface consists of SDAP, PDCP, RLC and MAC sublayer, and the physical layer. Sidelink Radio bearers (SLRB) are categorized into two groups: sidelink data radio bearers (SL DRB) for user plane data and sidelink signaling radio bearers (SL SRB) for control plane data. Separate SL SRBs using different SCCHs are configured for PC5-RRC and PC5-S signaling respectively.

The MAC sublayer provides the following services and functions over the PC5 interface:

Radio resource selection; Packet filtering; Priority handling between uplink and sidelink transmissions for a given UE; Sidelink CSI reporting. With LCP restrictions in MAC, only sidelink logical channels belonging to the same destination can be multiplexed into a MAC PDU for every unicast, groupcast and broadcast transmission which is associated to the destination. NG-RAN can also control whether a sidelink logical channel can utilize the resources allocated to a configured sidelink grant Type 1. For packet filtering, a SL-SCH MAC header including portions of both Source Layer-2 ID and a Destination Layer-2 ID is added to each MAC PDU as specified in subclause 8.x. LCD included within a MAC subheader uniquely identifies a logical channel within the scope of the Source Layer-2 ID and Destination Layer-2 ID combination. The following logical channels are used in sidelink:

Sidelink Control Channel (SCCH): a sidelink channel for transmitting control information from one UE to other UE(s);

Sidelink Traffic Channel (STCH): a sidelink channel for transmitting user information from one UE to other UE(s);

Sidelink Broadcast Control Channel (SBCCH): a sidelink channel for broadcasting sidelink system information from one UE to other UE(s).

The following connections between logical channels and transport channels exist:

SCCH can be mapped to SL-SCH;
STCH can be mapped to SL-SCH;
SBCCH can be mapped to SL-BCH.

The RRC sublayer provides the following services and functions over the PC5 interface:

Transfer of a PC5-RRC message between peer UEs;
Maintenance and release of a PC5-RRC connection between two UEs;
Detection of sidelink radio link failure for a PC5-RRC connection.

A PC5-RRC connection is a logical connection between two UEs for a pair of Source and Destination Layer-2 IDs which is considered to be established after a corresponding PC5 unicast link is established as specified in TS 23.287. There is one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages are used for a UE to transfer UE capability and sidelink configuration including SLRB configuration to the peer UE. Both peer UEs can exchange their own UE capability and sidelink configuration using separate bi-directional procedures in both sidelink directions. If it is not interested in sidelink transmission, if sidelink RLF on the PC5-RRC connection is declared, or if the Layer-2 link release procedure is completed as specified in TS 23.287, UE releases the PC5-RRC connection.

The UE can operate in two modes for resource allocation in sidelink:

Scheduled resource allocation, characterized by:
The UE needs to be RRC_CONNECTED in order to transmit data;
NG-RAN schedules transmission resources.
UE autonomous resource selection, characterized by:
The UE can transmit data when inside NG-RAN coverage, irrespective of which RRC state the UE is in, and when outside NG-RAN coverage;
The UE autonomously selects transmission resources from a pool of resources.
For NR sidelink communication, the UE performs sidelink transmissions only on a single carrier.

Scheduled Resource Allocation

NG-RAN can dynamically allocate resources to the UE via the SL-RNTI on PDCCH(s) for NR sidelink Communication. In addition, NG-RAN can allocate sidelink resources to UE with two types of configured sidelink grants:

With type 1, RRC directly provides the configured sidelink grant for NR sidelink communication
With type 2, RRC provides the periodicity of the configured sidelink grant while PDCCH can either signal and activate the configured sidelink grant, or deactivate it. The PDCCH provides the actual grant (i.e., resources) to be used. The PDCCH is addressed to SL-CS-RNTI for NR sidelink communication and SL Semi-Persistent Scheduling V-RNTI for V2X sidelink communication.

For the UE performing NR sidelink communication, there can be more than one configured sidelink grant activated at a time on the carrier configured for sidelink transmission. When beam failure or physical layer problem occurs on NR Uu, the UE can continue using the configured sidelink grant Type 1. During handover, the UE can be provided with configured sidelink grants via handover command, regardless of the type. If provided, the UE activates the configured sidelink grant Type 1 upon reception of the handover command. The UE can send sidelink buffer status report to support scheduler operation in NG-RAN. The sidelink buffer status reports refer to the data that is buffered in for a group of logical channels (LCG) per destination in the UE. Eight LCGs are used for reporting of the sidelink buffer status reports. Two formats, which are SL BSR and truncated SL BSR, are used.

UE sends SL BSR for dynamic resource allocation, in following cases
- SL data, for a sidelink logical channel of a ProSe Destination, becomes available for transmission in the RLC entity or in the PDCP entity and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, in which case the Sidelink BSR is referred below to as "Regular Sidelink BSR";
- UL resources are allocated and number of padding bits remaining after a Padding BSR has been triggered is equal to or larger than the size of the Sidelink BSR MAC control element containing the buffer status for at least one LCG of a ProSe Destination plus its subheader, in which case the Sidelink BSR is referred below to as "Padding Sidelink BSR";
- retx-BSR-TimerSL expires and the MAC entity has data available for transmission for any of the sidelink logical channels, in which case the Sidelink BSR is referred below to as "Regular Sidelink BSR";
- periodic-BSR-TimerSL expires, in which case the Sidelink BSR is referred below to as "Periodic Sidelink BSR";

UE Autonomous Resource Allocation

The UE autonomously selects sidelink grant from a pool of resources provided by broadcast system information or dedicated signaling while inside NG-RAN coverage or by preconfiguration while outside NG-RAN coverage.

For NR sidelink communication, the pools of resources can be provided for a given validity area where the UE does not need to acquire a new pool of resources while moving within the validity area, at least when this pool is provided by SIB (e.g., reuse valid area of NR SIB). NR SIB validity mechanism is reused to enable validity area for SL resource pool configured via broadcasted system information. The UE is allowed to temporarily use UE autonomous resource selection with random selection for sidelink transmission based on configuration of the exceptional transmission resource pool.

For V2X sidelink transmission, during handover, transmission resource pool configurations including exceptional transmission resource pool for the target cell can be signaled in the handover command to reduce the transmission interruption. In this way, the UE may use the V2X sidelink transmission resource pools of the target cell before the handover is completed as long as either synchronization is performed with the target cell in case eNB is configured as synchronization source or synchronization is performed with GNSS in case GNSS is configured as synchronization source. If the exceptional transmission resource pool is included in the handover command, the UE uses randomly selected resources from the exceptional transmission resource pool, starting from the reception of handover command. If the UE is configured with scheduled resource allocation in the handover command, the UE continues to use the exceptional transmission resource pool while the timer associated with handover is running. If the UE is configured with autonomous resource selection in the target cell the UE continues to use the exceptional transmission resource pool until the sensing results on the transmission resource pools for autonomous resource selection are available. For exceptional cases (e.g., during RLF, during transition from RRC IDLE to RRC CONNECTED or during change of dedicated V2X sidelink resource pools within a cell), the UE may select resources in the exceptional pool provided in serving cell's SIB21 or in dedicated signaling based on random selection, and uses them temporarily. During cell reselection, the RRC_IDLE UE may use the randomly selected resources from the exceptional transmission resource pool of the reselected cell until the sensing results on the transmission resource pools for autonomous resource selection are available.

UE can be configured with both scheduled resource allocation (i.e., Mode 1) and autonomous resource allocation (i.e., Mode 2) scheduling modes. gNB indicates scheduling mode (Mode 1 or Mode 2) associated with each SL LCH. UE multiplexes SL LCH(s) associated with same scheduling mode in SL MAC PDU. This approach may lead to wastage of resources. Some mechanism to multiplex SL LCH associated with a scheduling mode in SL grant of another scheduling mode is needed.

Description of the invention in detail (Including its operation, purpose, environment and how your invention overcomes the shortcomings of the prior art). Begin with a system level diagram and associated high level description of your invention in the context of a possible product deployment of your invention, for example a handset, a base station, and/or a wireless network comprising one or more base stations and one or more handsets.

Logical Channel Multiplexing

Method 1

Embodiment 1

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:
- Schedule/include data from SL LCH(s) associated with scheduling mode of the SL grant as follows:
- Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321.

Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

if any resources remain, all the SL LCHs are served in a strict decreasing priority order (regardless of the value of Bj) until either the data for that logical channel or the SL grant is exhausted, whichever comes first. Logical channels configured with equal priority are served equally (or up to UE implementation).

If all data from SL LCHs associated with scheduling mode of the SL grant is scheduled/included AND if there is remaining SL grant: UE schedule/include data from SL LCHs associated with a scheduling mode different from scheduling mode of the SL grant as follows:

Allocate resources to SL LCHs with Bj>0 in decreasing priority, where SL LCHs are allocated resources up to Bj. Parameter Bj is maintained for every SL LCH as specified in TS 38.321.

if any resources remain, all the SL LCHs having data available for transmission are served in a strict decreasing priority order (regardless of the value of Bj) until either the data for that logical channel or the SL grant is exhausted, whichever comes first. Logical channels configured with equal priority are served equally (or up to UE implementation).

Figure 4:
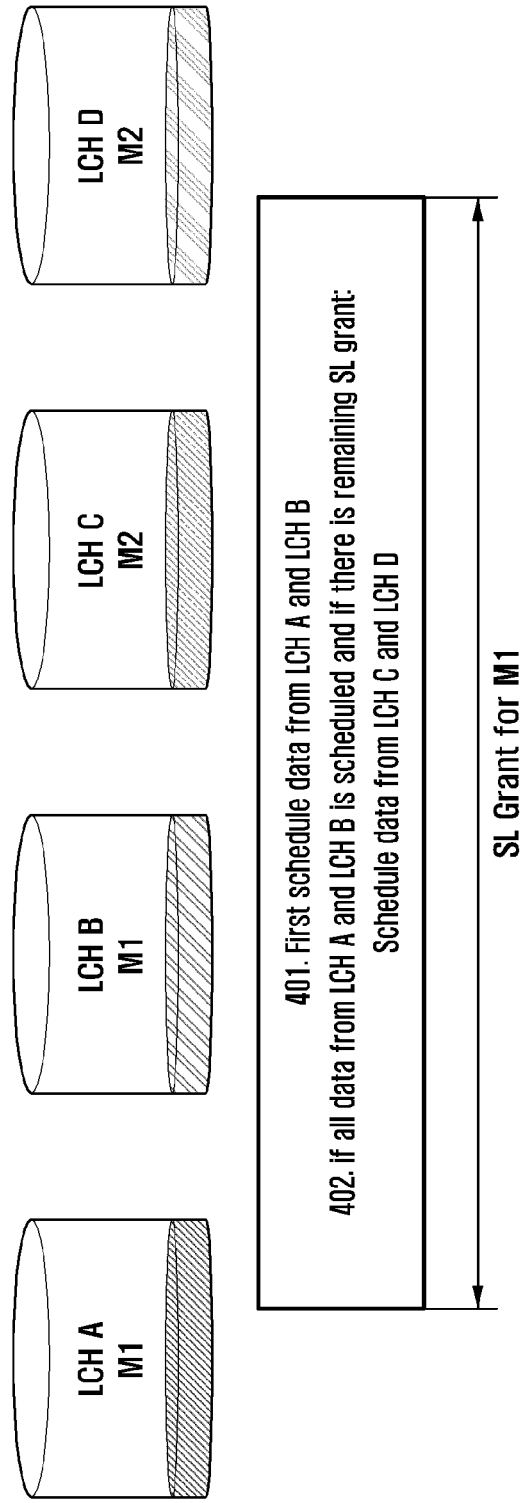
FIG. 4 illustrates an embodiment of UE operation when scheduling mode is changed from M2 to M1 for one or more SL LCHs.

FIG. 4 is an example illustration. There are four SL LCHs (LCH A, LCH B, LCH C and LCH D) associated with a destination (or source and destination pair). LCH A and LCH B are associated with scheduling mode M1. LCH C and LCH D are associated with scheduling mode M2. UE has a SL grant for scheduling mode M1. UE generates SL MAC PDU using the data available for transmission in SL LCH(s) of a destination (or of a source and destination pair) and transmits the generated SL MAC PDU using SL grant (or SL SCH resources) for M1. In the SL MAC PDU, UE first schedules data from LCH A and LCH B which are associated with scheduling mode M1 (401). If all data from LCH A and LCH B is scheduled and if there is remaining SL grant, UE schedules data from SL LCHs of M2 i.e., LCH C and LCH D (402).

Embodiment 2

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:

Schedule/include data from SL LCH(s) associated with scheduling mode of the SL grant as follows:

Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

if any resources remain, all the SL LCHs having data available for transmission are served in a strict decreasing priority order (regardless of the value of Bj) until either the data for that logical channel or the SL grant is exhausted, whichever comes first. Logical channels configured with equal priority are served equally (or up to UE implementation).

If 'multilplexingOtherModeAllowed' is configured (multilplexingOtherModeAllowed can be indicated by gNB using RRC signaling message):

if all data from SL LCHs associated with scheduling mode of the SL grant is scheduled/included AND if there is remaining SL grant: UE schedule/include data from SL LCHs associated with a scheduling mode different from scheduling mode of the SL grant as follows:

Allocate resources to SL LCHs with Bj>0 in decreasing priority, where SL LCHs are allocated resources up to Bj. Parameter Bj is maintained for every SL LCH as specified in TS 38.321.

if any resources remain, all the SL LCHs having data available for transmission are served in a strict decreasing priority order (regardless of the value of Bj) until either the data for that logical channel or the SL grant is exhausted, whichever comes first. Logical channels configured with equal priority are served equally (or up to UE implementation).

Embodiment 3

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of selected destination (or of a source and destination pair) in SL MAC PDU as follows:

schedule/include data from SL LCH(s) associated with scheduling mode of the SL grant as follows:

Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

if any resources remain, all the SL LCHs having data available for transmission are served in a strict decreasing priority order (regardless of the value of Bj) until either the data for that logical channel or the SL grant is exhausted, whichever comes first. Logical channels configured with equal priority are served equally (or up to UE implementation).

if all data from SL LCHs associated with scheduling mode of the SL grant is scheduled/included AND if there is remaining SL grant: UE schedule/include data from SL LCHs associated with a scheduling mode different from scheduling mode of the SL grant and for which multilplexingOtherModeAllowed is configured (multilplexingOtherModeAllowed can be indicated by gNB using RRC signaling message, indication can be per SL LCH) as follows:

Allocate resources to SL LCHs with Bj>0 in decreasing priority, where SL LCHs are allocated resources up to Bj. Parameter Bj is maintained for every SL LCH as specified in TS 38.321.

if any resources remain, all the SL LCHs having data available for transmission are served in a strict decreasing priority order (regardless of the value of Bj) until either the data for that logical channel or the SL grant is exhausted, whichever comes first. Logical channels configured with equal priority are served equally (or up to UE implementation).

Method 2

Embodiment 1

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:

schedule/include data from SL LCH(s) associated with scheduling mode of the SL grant as follows:

Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

If there is remaining SL grant, allocate resources to the SL LCHs (irrespective of associated scheduling mode) having data available for transmission in a strict decreasing priority order (regardless of the value of Bj) until either the data for that logical channel or the SL grant is exhausted, whichever comes first. Logical channels configured with equal priority are served equally (or up to UE implementation).

Figure 5:
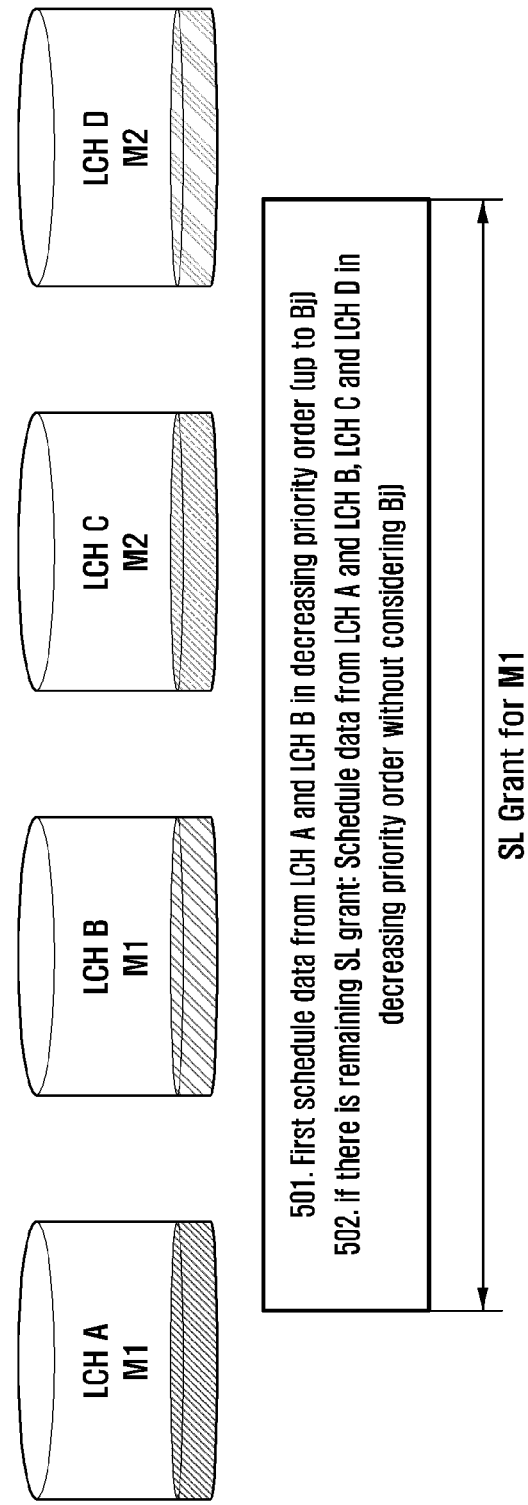
FIG. 5 illustrates another embodiment of UE operation when scheduling mode is changed from M2 to M1 for one or more SL LCHs.

FIG. 5 is an example illustration. There are four SL LCHs (LCH A, LCH B, LCH C and LCH D) associated with a destination (or source and destination pair). LCH A and LCH B are associated with scheduling mode M1. LCH C and LCH D are associated with scheduling mode M2. UE has a SL grant for scheduling mode M1. UE generates SL MAC PDU using the data available for transmission in SL LCH(s) of a destination (or of a source and destination pair) and transmits the generated SL MAC PDU using SL grant (or SL SCH resources) for M1. In the SL MAC PDU, UE first schedules data from LCH A and LCH B which are associated with scheduling mode M1, wherein data from LCH A and LCH B is included in decreasing priority order and up to Bj (501). If there is remaining SL grant, UE schedules data from all SL LCHs (irrespective of scheduling mode) in decreasing priority order (502).

Embodiment 2

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:

schedule/include data from SL LCH(s) associated with scheduling mode of the SL grant as follows:

Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

If there is remaining SL grant:
If 'multilplexingOtherModeAllowed' is configured (multilplexingOtherModeAllowed can be indicated by gNB using RRC signaling message):
allocate resources to the SL LCHs (irrespective of associated scheduling mode) having data available for transmission in a strict decreasing priority order (regardless of the value of Bj) until either the data for that logical channel or the SL grant is exhausted, whichever comes first. Logical channels configured with equal priority are served equally (or up to UE implementation).
Else
allocate resources to the SL LCHs associated with scheduling mode of SL grant having data available for transmission in a strict decreasing priority order (regardless of the value of Bj) until either the data for that logical channel or the SL grant is exhausted, whichever comes first. Logical channels configured with equal priority are served equally (or up to UE implementation).

Embodiment 3

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:
schedule/include data from SL LCH(s) associated with scheduling mode of the SL grant as follows:
Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.
If there is remaining SL grant:
allocate resources to the SL LCHs associated with scheduling mode of SL grant and SL LCHs associated with scheduling mode different from scheduling mode of SL grant for which 'multilplexingOtherModeAllowed' is configured having data available for transmission in a strict decreasing priority order (regardless of the value of Bj) until either the data for that logical channel or the SL grant is exhausted, whichever comes first. Logical channels configured with equal priority are served equally (or up to UE implementation).

Method 3

Embodiment 1

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:
Schedule/include data from SL LCH(s) associated with scheduling mode of the SL grant as follows:
Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.
If there is remaining SL grant, allocate resources to the SL LCHs with Bj>0 and associated with scheduling mode different from scheduling mode of SL grant in a strict decreasing priority order where SL LCHs are allocated resources up to Bj.
If there is still remaining SL grant, allocate resources to the SL LCHs (irrespective of associated scheduling mode) having data available for transmission in a strict decreasing priority order (regardless of the value of Bj) until either the data for that logical channel or the SL grant is exhausted, whichever comes first. Logical channels configured with equal priority are served equally (or up to UE implementation).

Figure 6:
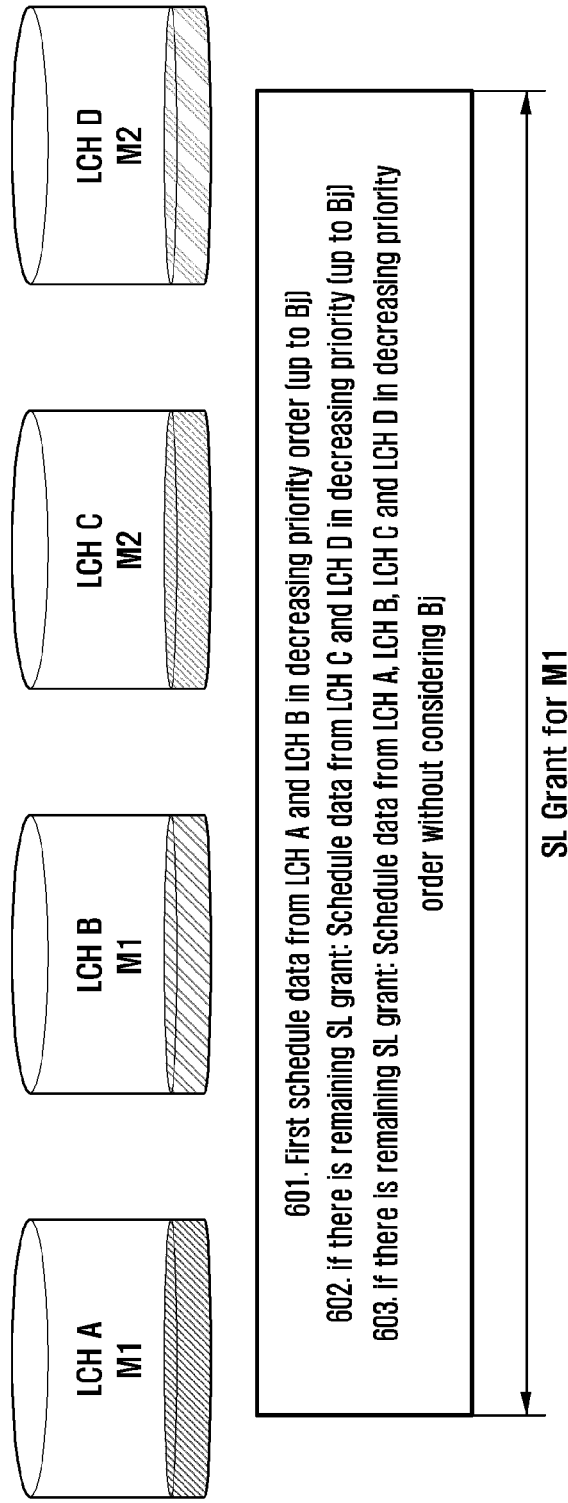
FIG. 6 illustrates another embodiment of UE operation when scheduling mode is changed from M2 to M1 for one or more SL LCHs.

FIG. 6 is an example illustration. There are four SL LCHs (LCH A, LCH B, LCH C and LCH D) associated with a destination (or source and destination pair). LCH A and LCH B are associated with scheduling mode M1. LCH C and LCH D are associated with scheduling mode M2. UE has a SL grant for scheduling mode M1. UE generates SL MAC PDU using the data available for transmission in SL LCH(s) of a destination (or of a source and destination pair) and transmits the generated SL MAC PDU using SL grant (or SL SCH resources) for M1. In the SL MAC PDU, UE first schedules data from LCH A and LCH B which are associated with scheduling mode M1, wherein data from LCH A and LCH B is included in decreasing priority order and up to Bj (601). If there is remaining SL grant, UE then schedules data from LCH C and LCH D which are associated with scheduling mode M2, wherein data from LCH C and LCH D is included in decreasing priority order and up to Bj (602). If there is still remaining SL grant, UE schedules data from all SL LCHs (irrespective of scheduling mode) in decreasing priority order (603).

Embodiment 2

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:
- Schedule/include data from SL LCH(s) associated with scheduling mode of the SL grant as follows:
- Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.
- If 'multilplexingOtherModeAllowed' is configured (multilplexingOtherModeAllowed can be indicated by gNB using RRC signaling message):
- If there is remaining SL grant, allocate resources to the SL LCHs with Bj>0 and associated with scheduling mode different from scheduling mode of SL grant in a strict decreasing priority order where SL LCHs are allocated resources up to Bj.
- If there is still remaining SL grant, allocate resources to the SL LCHs (irrespective of associated scheduling mode) having data available for transmission in a strict decreasing priority order (regardless of the value of Bj) until either the data for that logical channel or the SL grant is exhausted, whichever comes first. Logical channels configured with equal priority are served equally (or up to UE implementation).
- If 'multilplexingOtherModeAllowed' is not configured: allocate resources to the SL LCHs associated with scheduling mode of SL grant having data available for transmission in a strict decreasing priority order (regardless of the value of Bj) until either the data for that logical channel or the SL grant is exhausted, whichever comes first. Logical channels configured with equal priority are served equally (or up to UE implementation).

Embodiment 3

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:
- Schedule/include data from SL LCH(s) associated with scheduling mode of the SL grant as follows:
- Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.
- If there is remaining SL grant, allocate resources to the 'SL LCHs with Bj>0 and associated with scheduling mode different from scheduling mode of SL grant and for which multilplexingOtherModeAllowed is configured', in a strict decreasing priority order where SL LCHs are allocated resources up to Bj.
- If there is still remaining SL grant, allocate resources to the SL LCHs associated with scheduling mode of SL grant and 'SL LCHs associated with scheduling mode different from scheduling mode of SL grant and for which multilplexingOtherModeAllowed' having data available for transmission in a strict decreasing priority order (regardless of the value of Bj) until either the data for that logical channel or the SL grant is exhausted, whichever comes first. Logical channels configured with equal priority are served equally (or up to UE implementation).

Method 4

Embodiment 1

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation) or both. gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:

Schedule/include data from SL LCH(s) associated with at least the scheduling mode of the SL grant as follows:

Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

if any resources remain, all the SL LCHs are served in a strict decreasing priority order (regardless of the value of Bj) until either the data for that logical channel or the SL grant is exhausted, whichever comes first. Logical channels configured with equal priority are served equally (or up to UE implementation).

If all data from SL LCHs associated with at least the scheduling mode of the SL grant is scheduled/included AND if there is remaining SL grant: UE schedule/include data from SL LCHs associated with only one scheduling mode wherein the scheduling mode is different from scheduling mode of the SL grant as follows:

Allocate resources to SL LCHs with Bj>0 in decreasing priority, where SL LCHs are allocated resources up to Bj. Parameter Bj is maintained for every SL LCH as specified in TS 38.321.

if any resources remain, all the SL LCHs having data available for transmission are served in a strict decreasing priority order (regardless of the value of Bj) until either the data for that logical channel or the SL grant is exhausted, whichever comes first. Logical channels configured with equal priority are served equally (or up to UE implementation).

Figure 7:
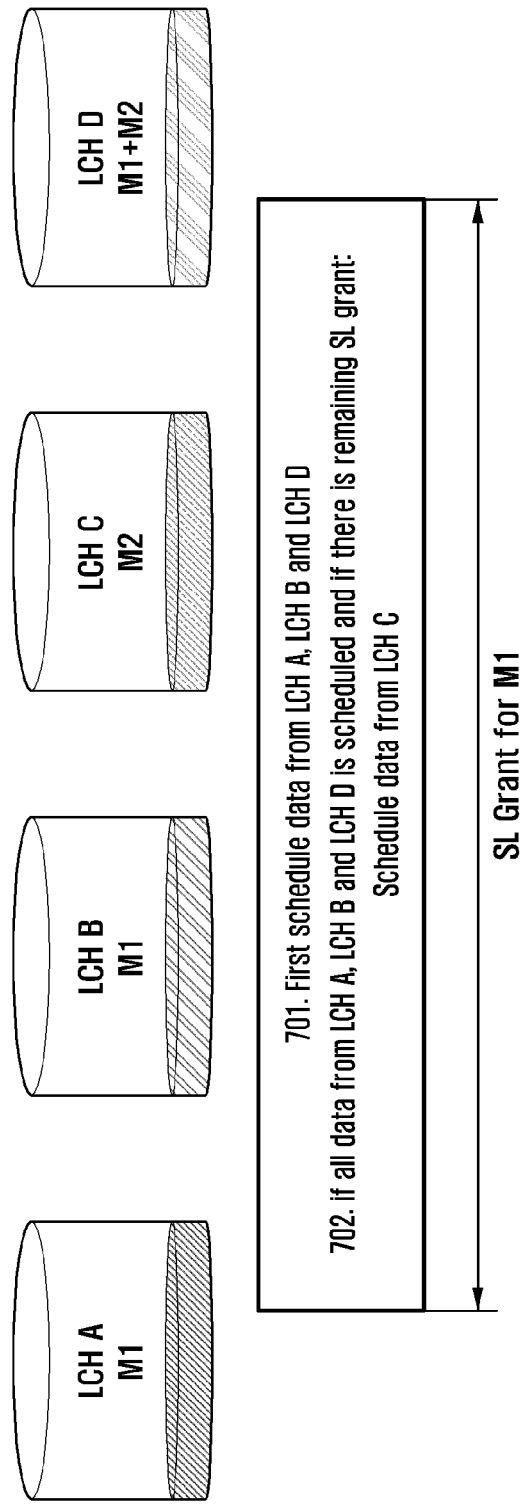
FIG. 7 illustrates another embodiment of UE operation when scheduling mode is changed from M2 to M1 for one or more SL LCHs.

FIG. 7 is an example illustration. There are four SL LCHs (LCH A, LCH B, LCH C and LCH D) associated with a destination (or source and destination pair). LCH A and LCH B are associated with scheduling mode M1. LCH C is associated with scheduling mode M2. LCH D is associated with both scheduling mode M1 and M2. UE has a SL grant for scheduling mode M1. UE generates SL MAC PDU using the data available for transmission in SL LCH(s) of a destination (or of a source and destination pair) and transmits the generated SL MAC PDU using SL grant (or SL SCH resources) for M1. In the SL MAC PDU, UE first schedules data from LCH A, LCH B and LCH D which are at least associated with scheduling mode M1 (701). If all data from LCH A, LCH B and LCH D are scheduled and if there is remaining SL grant, UE schedules data from SL LCH associated with only M2 i.e., LCH C (702).

Embodiment 2

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation) or both. gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:

Schedule/include data from SL LCH(s) associated with at least the scheduling mode of the SL grant as follows:

Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

if any resources remain, all the SL LCHs are served in a strict decreasing priority order (regardless of the value of Bj) until either the data for that logical channel or the SL grant is exhausted, whichever comes first. Logical channels configured with equal priority are served equally (or up to UE implementation).

If 'multilplexingOtherModeAllowed' is configured (multilplexingOtherModeAllowed can be indicated by gNB using RRC signaling message):

If all data from SL LCHs associated with at least the scheduling mode of the SL grant is scheduled/included AND if there is remaining SL grant: UE schedule/include data from SL LCHs associated with only one scheduling mode wherein the scheduling mode is different from scheduling mode of the SL grant as follows:

Allocate resources to SL LCHs with Bj>0 in decreasing priority, where SL LCHs are allocated resources up to Bj. Parameter Bj is maintained for every SL LCH as specified in TS 38.321.

if any resources remain, all the SL LCHs having data available for transmission are served in a strict decreasing priority order (regardless of the value of Bj) until either the data for that logical channel or the SL grant is exhausted, whichever comes first. Logical channels configured with equal priority are served equally (or up to UE implementation).

Embodiment 3

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation) or both. gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of selected destination (or of a source and destination pair) in SL MAC PDU as follows:
Schedule/include data from SL LCH(s) associated with at least the scheduling mode of the SL grant as follows:
Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.
if any resources remain, all the SL LCHs are served in a strict decreasing priority order (regardless of the value of Bj) until either the data for that logical channel or the SL grant is exhausted, whichever comes first. Logical channels configured with equal priority are served equally (or up to UE implementation).
if all data from SL LCHs associated with at least the scheduling mode of the SL grant is scheduled/included AND if there is remaining SL grant: UE schedule/include data from SL LCHs associated with only one scheduling mode wherein the scheduling mode is different from scheduling mode of the SL grant and for which multilplexingOtherModeAllowed is configured (multilplexingOtherModeAllowed can be indicated by gNB using RRC signaling message, indication can be per SL LCH) as follows:
Allocate resources to SL LCHs with Bj>0 in decreasing priority, where SL LCHs are allocated resources up to Bj. Parameter Bj is maintained for every SL LCH as specified in TS 38.321.
if any resources remain, all the SL LCHs having data available for transmission are served in a strict decreasing priority order (regardless of the value of Bj) until either the data for that logical channel or the SL grant is exhausted, whichever comes first. Logical channels configured with equal priority are served equally (or up to UE implementation).
Method 5:

Embodiment 1

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation) or both. gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

Figure 8:
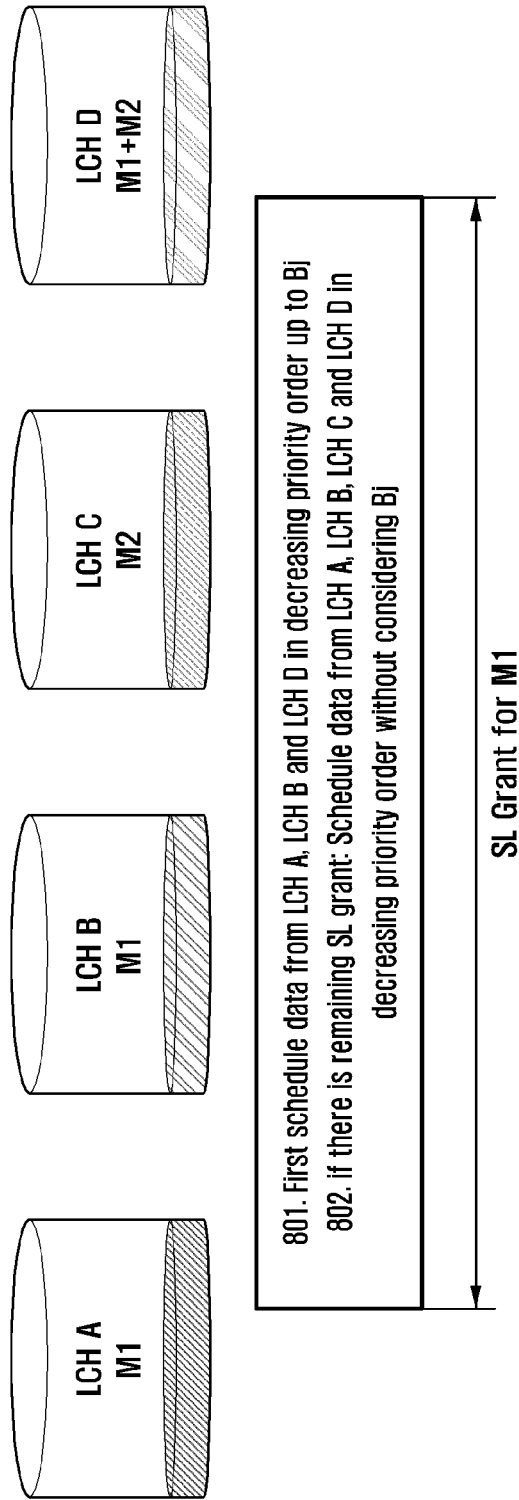
FIG. 8 illustrates an embodiment of UE operation when scheduling mode is changed from M1 to M2 for one or more SL LCHs.

In one embodiment of this disclosure, for a SL grant, UE includes the data available from various SL LCHs (having data available for transmission) of a destination (or of a source and destination pair) in SL MAC PDU as follows:
schedule/include data from SL LCH(s) associated with at least the scheduling mode of the SL grant as follows:
Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.
If there is remaining SL grant, allocate resources to the SL LCHs (irrespective of associated scheduling mode) having data available for transmission in a strict decreasing priority order (regardless of the value of Bj) until either the data for that logical channel or the SL grant is exhausted, whichever comes first. Logical channels configured with equal priority are served equally (or up to UE implementation).
FIG. 8 is an example illustration. There are four SL LCHs (LCH A, LCH B, LCH C and LCH D) associated with a destination (or source and destination pair). LCH A and LCH B are associated with scheduling mode M1. LCH C is associated with scheduling mode M2. LCH D is associated with both scheduling mode M1 and M2. UE has a SL grant for scheduling mode M1. UE generates SL MAC PDU using the data available for transmission in SL LCH(s) of a destination (or of a source and destination pair) and transmits the generated SL MAC PDU using SL grant (or SL SCH resources) for M1. In the SL MAC PDU, UE first schedules data from LCH A, LCH B and LCH D which are associated with at least scheduling mode M1, wherein data from LCH A, LCH B and LCH D is included in decreasing priority order and up to Bj (801). If there is remaining SL grant, UE schedules data from all SL LCHs (irrespective of scheduling mode) in decreasing priority order (802).

Embodiment 2

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation) or both. gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:
schedule/include data from SL LCH(s) associated with at least the scheduling mode of the SL grant as follows:

Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

If there is remaining SL grant:
If 'multilplexingOtherModeAllowed' is configured (multilplexingOtherModeAllowed can be indicated by gNB using RRC signaling message):
allocate resources to the SL LCHs (irrespective of associated scheduling mode) having data available for transmission in a strict decreasing priority order (regardless of the value of Bj) until either the data for that logical channel or the SL grant is exhausted, whichever comes first. Logical channels configured with equal priority are served equally (or up to UE implementation).
Else
allocate resources to the SL LCHs associated with at least the scheduling mode of SL grant having data available for transmission in a strict decreasing priority order (regardless of the value of Bj) until either the data for that logical channel or the SL grant is exhausted, whichever comes first. Logical channels configured with equal priority are served equally (or up to UE implementation).

Embodiment 3

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation) or both. gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:
schedule/include data from SL LCH(s) associated with at least the scheduling mode of the SL grant as follows:
Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.
If there is remaining SL grant:
allocate resources to the SL LCHs associated with at least the scheduling mode of SL grant and SL LCHs associated with scheduling mode different from scheduling mode of SL grant for which 'multilplexingOtherModeAllowed' is configured having data available for transmission in a strict decreasing priority order (regardless of the value of Bj) until either the data for that logical channel or the SL grant is exhausted, whichever comes first. Logical channels configured with equal priority are served equally (or up to UE implementation).

Method 6

Embodiment 1

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation) or both. gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:
Schedule/include data from SL LCH(s) associated with at least the scheduling mode of the SL grant as follows:
Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.
If there is remaining SL grant, allocate resources to the SL LCHs with Bj>0 and associated with only one scheduling mode which is different from scheduling mode of SL grant in a strict decreasing priority order where SL LCHs are allocated resources up to Bj.
If there is still remaining SL grant, allocate resources to the SL LCHs (irrespective of associated scheduling mode) having data available for transmission in a strict decreasing priority order (regardless of the value of Bj) until either the data for that logical channel or the SL grant is exhausted, whichever comes first. Logical channels configured with equal priority are served equally (or up to UE implementation).

Figure 9:
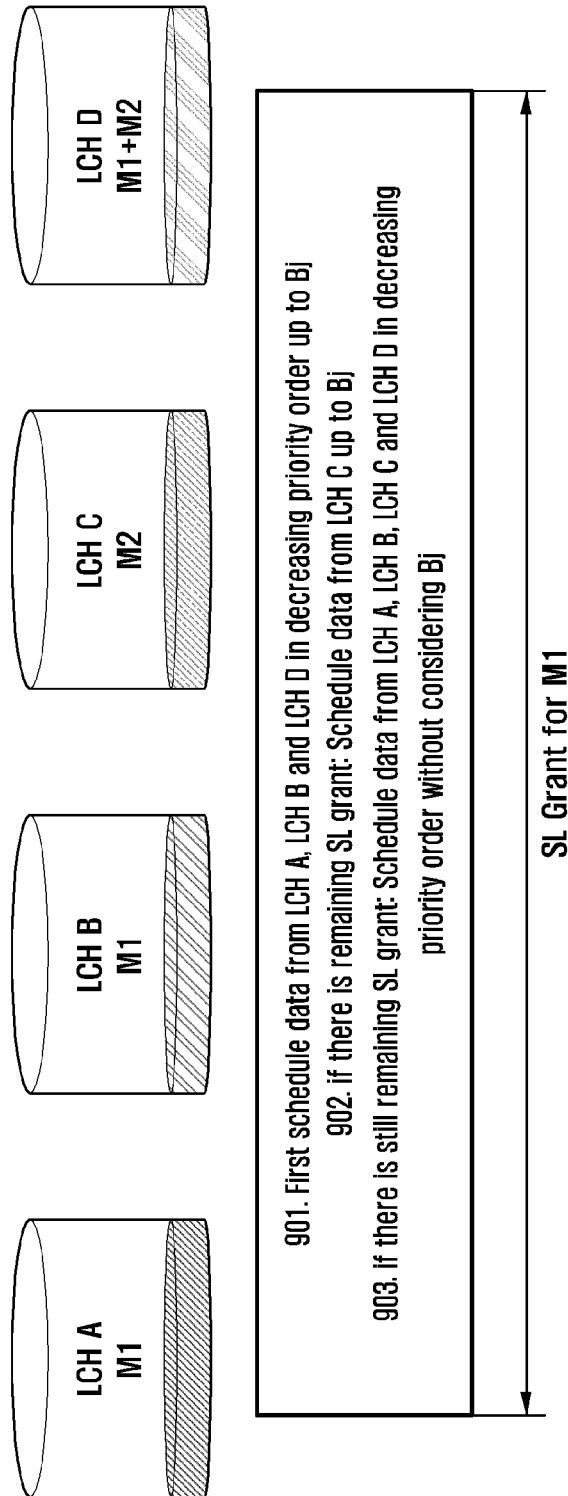
FIG. 9 illustrates another embodiment of UE operation when scheduling mode is changed from M1 to M2 for one or more SL LCHs.

FIG. 9 is an example illustration. There are four SL LCHs (LCH A, LCH B, LCH C and LCH D) associated with a destination (or source and destination pair). LCH A and LCH B are associated with scheduling mode M1. LCH C is associated with scheduling mode M2. LCH D is associated with both scheduling mode M1 and M2. UE has a SL grant for scheduling mode M1. UE generates SL MAC PDU using the data available for transmission in SL LCH(s) of a destination (or of a source and destination pair) and transmits the generated SL MAC PDU using SL grant (or SL SCH resources) for M1. In the SL MAC PDU, UE first schedules data from LCH A, LCH B and LCH D which are associated with at least scheduling mode M1, wherein data from LCH A, LCH B and LCH D is included in decreasing priority order and up to Bj (901). If there is remaining SL grant, UE then schedules data from LCH C which is associated with only scheduling mode M2, wherein data from LCH C is included up to Bj (902). If there is still remaining SL grant, UE schedules data from all SL LCHs (irrespective of scheduling mode) in decreasing priority order (903).

Embodiment 2

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation) or both. gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:

Schedule/include data from SL LCH(s) associated with at least the scheduling mode of the SL grant as follows:

Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

If 'multiplexingOtherModeAllowed' is configured (multilplexingOtherModeAllowed can be indicated by gNB using RRC signaling message):

If there is remaining SL grant, allocate resources to the SL LCHs with Bj>0 and associated with only one scheduling mode which is different from scheduling mode of SL grant in a strict decreasing priority order where SL LCHs are allocated resources up to Bj.

If there is still remaining SL grant, allocate resources to the SL LCHs (irrespective of associated scheduling mode) having data available for transmission in a strict decreasing priority order (regardless of the value of Bj) until either the data for that logical channel or the SL grant is exhausted, whichever comes first. Logical channels configured with equal priority are served equally (or up to UE implementation).

If 'multiplexingOtherModeAllowed' is not configured:

allocate resources to the SL LCHs associated with at least the scheduling mode of SL grant having data available for transmission in a strict decreasing priority order (regardless of the value of Bj) until either the data for that logical channel or the SL grant is exhausted, whichever comes first. Logical channels configured with equal priority are served equally (or up to UE implementation).

Embodiment 3

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation) or both. gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:

Schedule/include data from SL LCH(s) associated with at least the scheduling mode of the SL grant as follows:

Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

If there is remaining SL grant, allocate resources to the 'SL LCHs with Bj>0 and associated with only one scheduling mode which is different from scheduling mode of SL grant and for which multilplexingOtherModeAllowed is configured', in a strict decreasing priority order where SL LCHs are allocated resources up to Bj.

If there is still remaining SL grant, allocate resources to the SL LCHs associated with at least the scheduling mode of SL grant and 'SL LCHs associated with only one scheduling mode which is different from scheduling mode of SL grant and for which multiplexingOtherModeAllowed' having data available for transmission in a strict decreasing priority order (regardless of the value of Bj) until either the data for that logical channel or the SL grant is exhausted, whichever comes first. Logical channels configured with equal priority are served equally (or up to UE implementation).

Method 7

Embodiment 1

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:

Schedule/include data from SL LCH(s) associated with scheduling mode of the SL grant as follows:

Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

if any resources remain, all the SL LCHs are served in a strict decreasing priority order (regardless of the value of Bj) until either the data for that logical channel or the SL grant is exhausted, whichever comes first. Logical channels configured with equal priority are served equally (or up to UE implementation).

If the scheduling mode of SL grant is M1 and if all data from SL LCHs associated with scheduling mode of the SL grant is scheduled/included AND if there is remaining SL grant: UE schedule/include data from SL LCHs associated with a scheduling mode different from scheduling mode of the SL grant as follows:

Allocate resources to SL LCHs with Bj>0 in decreasing priority, where SL LCHs are allocated resources up to Bj. Parameter Bj is maintained for every SL LCH as specified in TS 38.321.

if any resources remain, all the SL LCHs having data available for transmission are served in a strict decreasing priority order (regardless of the value of Bj) until either the data for that logical channel or the SL grant is exhausted, whichever comes first. Logical channels configured with equal priority are served equally (or up to UE implementation).

Figure 10:
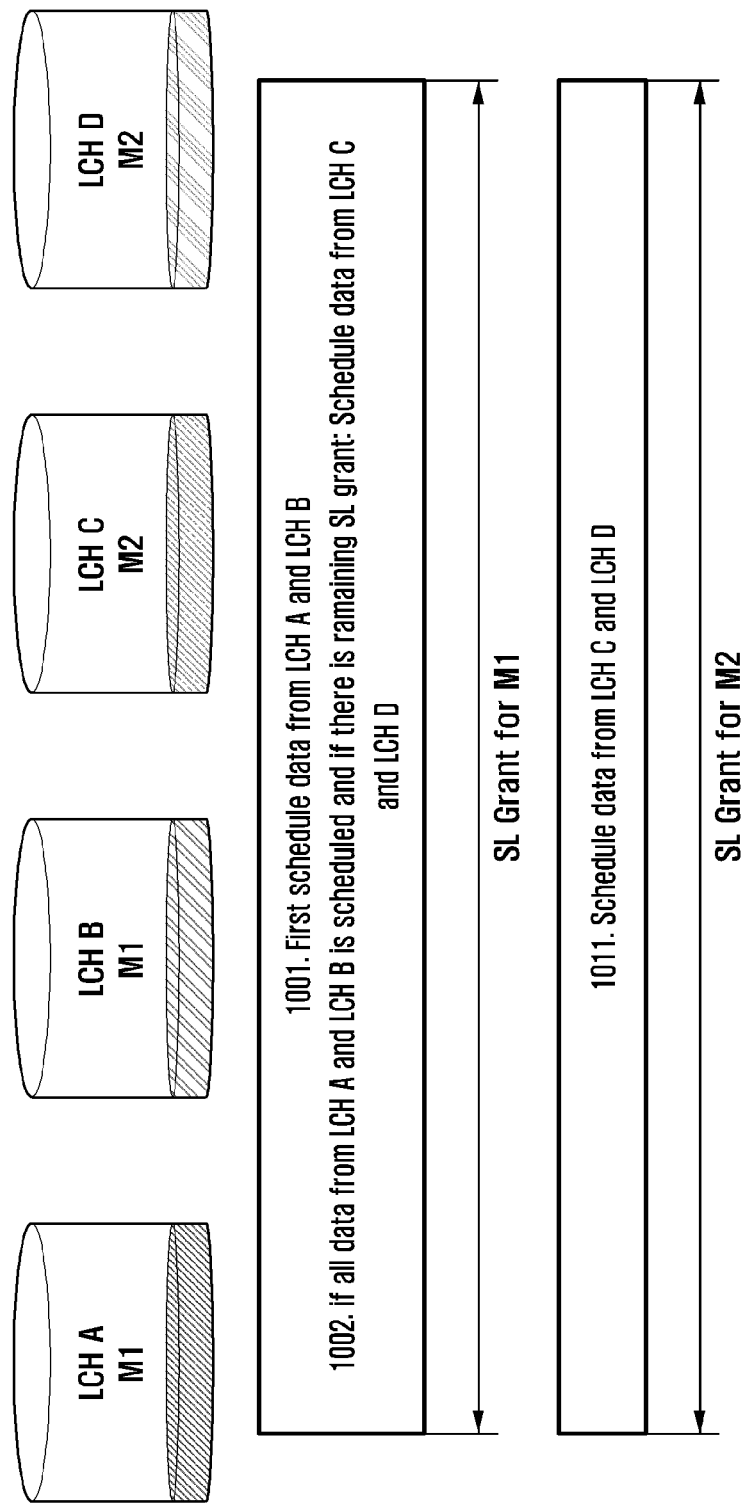
FIG. 10 is a block diagram of a UE according to an embodiment of the disclosure.

FIG. 10 is an example illustration. There are four SL LCHs (LCH A, LCH B, LCH C and LCH D) associated with a destination (or source and destination pair). LCH A and LCH B are associated with scheduling mode M1. LCH C and LCH D are associated with scheduling mode M2.

UE has a SL grant for scheduling mode M1. UE generates SL MAC PDU using the data available for transmission in SL LCH(s) of a destination (or of a source and destination pair) and transmits the generated SL MAC PDU using SL grant (or SL SCH resources) for M1. In the SL MAC PDU, UE first schedules data from LCH A and LCH B which are associated with scheduling mode M1 (1001). If all data from LCH A and LCH B is scheduled and if there is remaining SL grant, UE schedules data from SL LCHs of M2 i.e., LCH C and LCH D (1002).

UE has a SL grant for scheduling mode M2. UE generates SL MAC PDU using the data available for transmission in SL LCH(s) of a destination (or of a source and destination pair) and transmits the generated SL MAC PDU using SL grant (or SL SCH resources) for M2. In the SL MAC PDU, UE schedules data from LCH C and LCH D which are associated with scheduling mode M2 (1011). Note that in this case LCH associated with other scheduling mode i.e., M1 is not included.

Embodiment 2

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:

Schedule/include data from SL LCH(s) associated with scheduling mode of the SL grant as follows:

Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

if any resources remain, all the SL LCHs having data available for transmission are served in a strict decreasing priority order (regardless of the value of Bj) until either the data for that logical channel or the SL grant is exhausted, whichever comes first. Logical channels configured with equal priority are served equally (or up to UE implementation).

If the scheduling mode of SL grant is M1 and If 'multilplexingOtherModeAllowed' is configured (multilplexingOtherModeAllowed can be indicated by gNB using RRC signaling message):

if all data from SL LCHs associated with scheduling mode of the SL grant is scheduled/included AND if there is remaining SL grant: UE schedule/include data from SL LCHs associated with a scheduling mode different from scheduling mode of the SL grant as follows:
Allocate resources to SL LCHs with Bj>0 in decreasing priority, where SL LCHs are allocated resources up to Bj. Parameter Bj is maintained for every SL LCH as specified in TS 38.321.
if any resources remain, all the SL LCHs having data available for transmission are served in a strict decreasing priority order (regardless of the value of Bj) until either the data for that logical channel or the SL grant is exhausted, whichever comes first. Logical channels configured with equal priority are served equally (or up to UE implementation).

Embodiment 3

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of selected destination (or of a source and destination pair) in SL MAC PDU as follows:
  schedule/include data from SL LCH(s) associated with scheduling mode of the SL grant as follows:
  Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.
  if any resources remain, all the SL LCHs having data available for transmission are served in a strict decreasing priority order (regardless of the value of Bj) until either the data for that logical channel or the SL grant is exhausted, whichever comes first. Logical channels configured with equal priority are served equally (or up to UE implementation).
  If the scheduling mode of SL grant is M1 and if all data from SL LCHs associated with scheduling mode of the SL grant is scheduled/included AND if there is remaining SL grant: UE schedule/include data from SL LCHs associated with a scheduling mode different from scheduling mode of the SL grant and for which multilplexingOtherModeAllowed is configured (multilplexingOtherModeAllowed can be indicated by gNB using RRC signaling message, indication can be per SL LCH) as follows:
    Allocate resources to SL LCHs with Bj>0 in decreasing priority, where SL LCHs are allocated resources up to Bj. Parameter Bj is maintained for every SL LCH as specified in TS 38.321.
    if any resources remain, all the SL LCHs having data available for transmission are served in a strict decreasing priority order (regardless of the value of Bj) until either the data for that logical channel or the SL grant is exhausted, whichever comes first. Logical channels configured with equal priority are served equally (or up to UE implementation).

Method 8

Embodiment 1

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:
  schedule/include data from SL LCH(s) associated with scheduling mode of the SL grant as follows:
  Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.
  If there is remaining SL grant:
  If the scheduling mode of SL grant is M1, allocate resources to the SL LCHs (irrespective of associated scheduling mode) having data available for transmission in a strict decreasing priority order (regardless of the value of Bj) until either the data for that logical channel or the SL grant is exhausted, whichever comes first. Logical channels configured with equal priority are served equally (or up to UE implementation).
  If the scheduling mode of SL grant is not M1, allocate resources to the SL LCHs associated with scheduling mode of SL grant having data available for transmission in a strict decreasing priority order (regardless of the value of Bj) until either the data for that logical channel or the SL grant is exhausted, whichever comes first. Logical channels configured with equal priority are served equally (or up to UE implementation).

Figure 11:
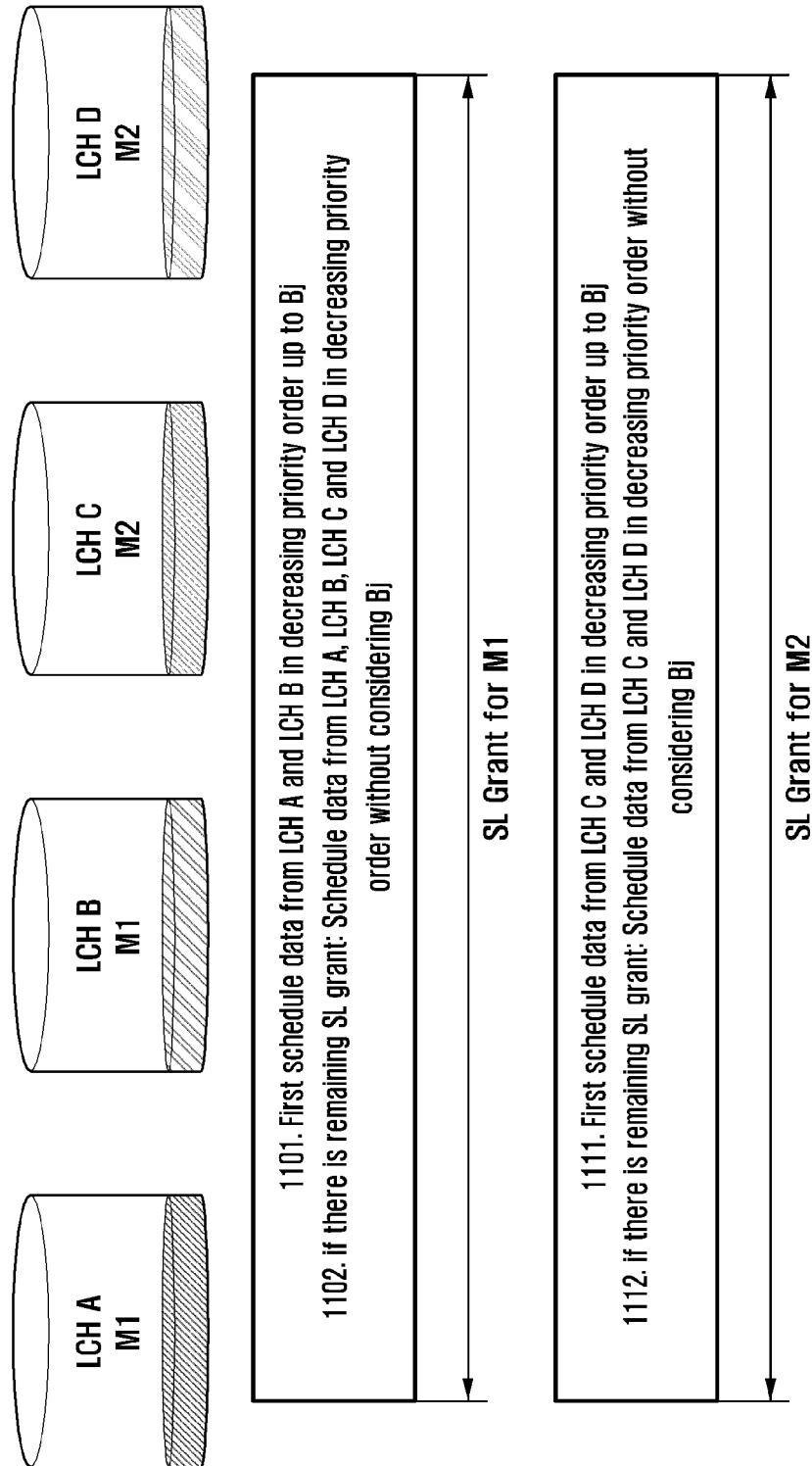
FIG. 11 is a block diagram of a base station according to an embodiment of the disclosure.

FIG. 11 is an example illustration. There are four SL LCHs (LCH A, LCH B, LCH C and LCH D) associated with a destination (or source and destination pair). LCH A and LCH B are associated with scheduling mode M1. LCH C and LCH D are associated with scheduling mode M2.

UE has a SL grant for scheduling mode M1. UE generates SL MAC PDU using the data available for transmission in SL LCH(s) of a destination (or of a source and destination pair) and transmits the generated SL MAC PDU using SL grant (or SL SCH resources) for M1. In the SL MAC PDU, UE first schedules data from LCH A and LCH B which are associated with scheduling mode M1, wherein data from LCH A and LCH B is included in decreasing priority order and up to Bj (1101). If there is remaining SL grant, UE schedules data from all SL LCHs (irrespective of scheduling mode) in decreasing priority order (1102).

UE has a SL grant for scheduling mode M2. UE generates SL MAC PDU using the data available for transmission in SL LCH(s) of a destination (or of a source and destination pair) and transmits the generated SL MAC PDU using SL grant (or SL SCH resources) for M2. In the SL MAC PDU, UE first schedules data from LCH C and LCH D which are associated with scheduling mode M2, wherein data from LCH C and LCH D is included in decreasing priority order and up to Bj (1111). If there is remaining SL grant, UE schedules data from all SL LCHs (irrespective of scheduling mode) in decreasing priority order (1112).

Embodiment 2

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:
schedule/include data from SL LCH(s) associated with scheduling mode of the SL grant as follows:
Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.
If there is remaining SL grant:
If 'multiplexingOtherModeAllowed' is configured (multilplexingOtherModeAllowed can be indicated by gNB using RRC signaling message) and If the scheduling mode of SL grant is M1:
allocate resources to the SL LCHs (irrespective of associated scheduling mode) having data available for transmission in a strict decreasing priority order (regardless of the value of Bj) until either the data for that logical channel or the SL grant is exhausted, whichever comes first. Logical channels configured with equal priority are served equally (or up to UE implementation).
Else
allocate resources to the SL LCHs associated with scheduling mode of SL grant having data available for transmission in a strict decreasing priority order (regardless of the value of Bj) until either the data for that logical channel or the SL grant is exhausted, whichever comes first. Logical channels configured with equal priority are served equally (or up to UE implementation).

Embodiment 3

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:
schedule/include data from SL LCH(s) associated with scheduling mode of the SL grant as follows:
Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.
If there is remaining SL grant:
If the scheduling mode of SL grant is M1:
allocate resources to the SL LCHs associated with scheduling mode of SL grant and SL LCHs associated with scheduling mode different from scheduling mode of SL grant for which 'multilplexingOtherModeAllowed' is configured having data available for transmission in a strict decreasing priority order (regardless of the value of Bj) until either the data for that logical channel or the SL grant is exhausted, whichever comes first. Logical channels configured with equal priority are served equally (or up to UE implementation).
Else
allocate resources to the SL LCHs associated with scheduling mode of SL grant having data available for transmission in a strict decreasing priority order (regardless of the value of Bj) until either the data for that logical channel or the SL grant is exhausted, whichever comes first. Logical channels configured with equal priority are served equally (or up to UE implementation).

Method 9

Embodiment 1

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:
  Schedule/include data from SL LCH(s) associated with scheduling mode of the SL grant as follows:
  Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.
  If the scheduling mode of SL grant is M1 and If there is remaining SL grant, allocate resources to the SL LCHs with Bj>0 and associated with scheduling mode different from scheduling mode of SL grant in a strict decreasing priority order where SL LCHs are allocated resources up to Bj.
  If there is still remaining SL grant,
  If the scheduling mode of SL grant is M1, allocate resources to the SL LCHs (irrespective of associated scheduling mode) having data available for transmission in a strict decreasing priority order (regardless of the value of Bj) until either the data for that logical channel or the SL grant is exhausted, whichever comes first. Logical channels configured with equal priority are served equally (or up to UE implementation).
  If the scheduling mode of SL grant is not M1, allocate resources to the SL LCHs associated with scheduling mode of SL grant having data available for transmission in a strict decreasing priority order (regardless of the value of Bj) until either the data for that logical channel or the SL grant is exhausted, whichever comes first. Logical channels configured with equal priority are served equally (or up to UE implementation).

Figure 12:
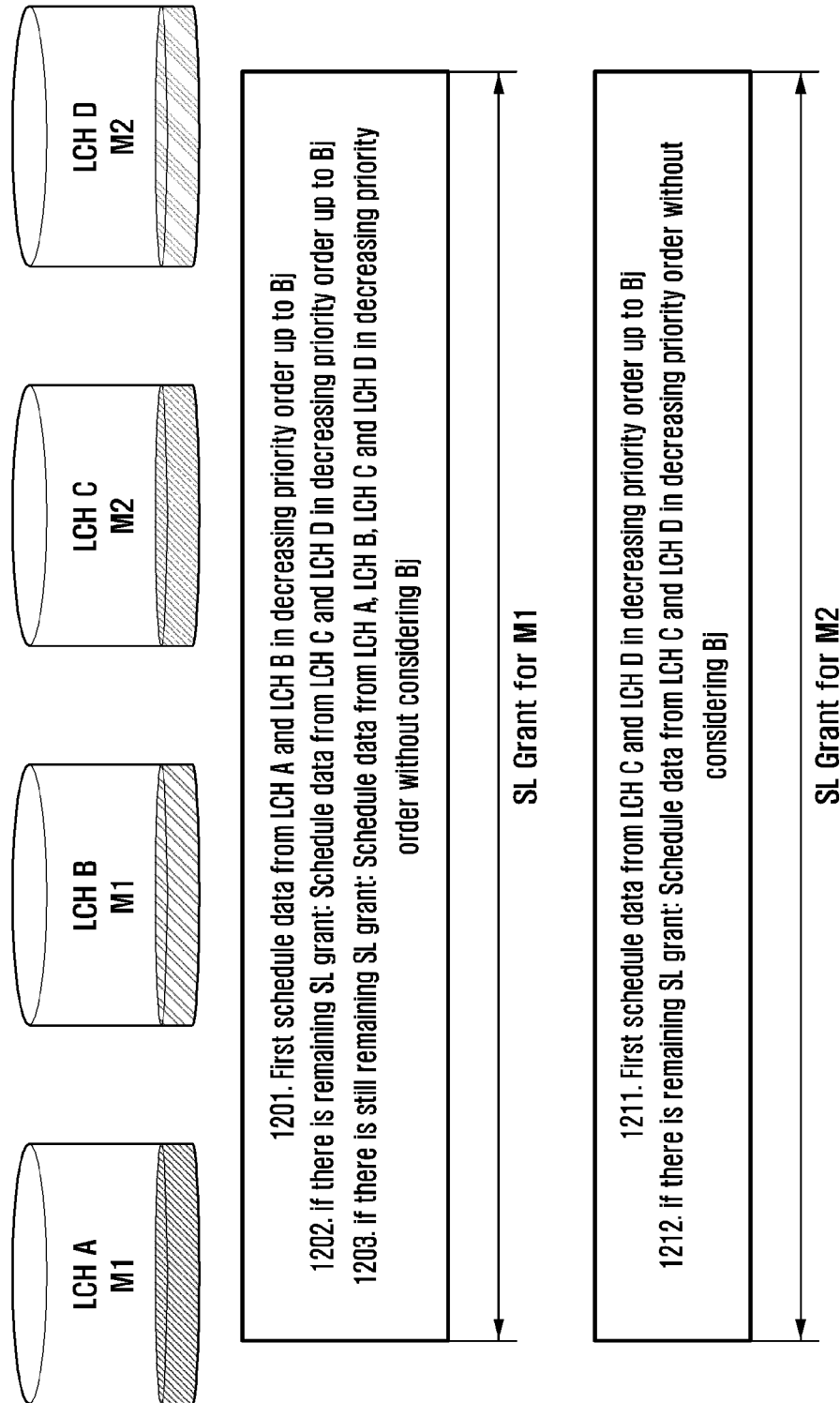
FIGS. 12-15 each illustrate example SL LCHs associated with a destination or source and destination pair according to embodiments of the disclosure.
Figure 13:
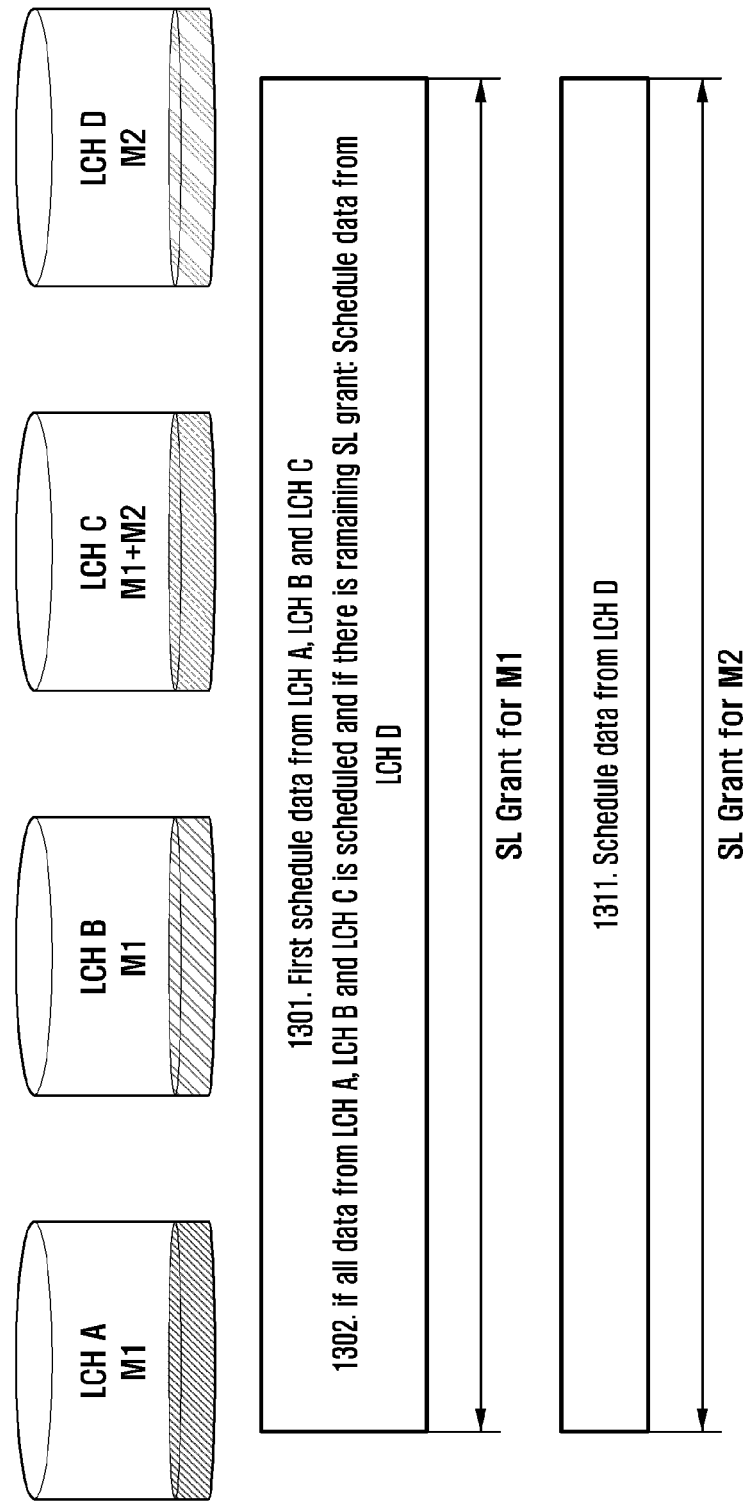

FIG. 12 is an example illustration. There are four SL LCHs (LCH A, LCH B, LCH C and LCH D) associated with a destination (or source and destination pair). LCH A and LCH B are associated with scheduling mode M1. LCH C and LCH D are associated with scheduling mode M2.

UE has a SL grant for scheduling mode M1. UE generates SL MAC PDU using the data available for transmission in SL LCH(s) of a destination (or of a source and destination pair) and transmits the generated SL MAC PDU using SL grant (or SL SCH resources) for M1. In the SL MAC PDU, UE first schedules data from LCH A and LCH B which are associated with scheduling mode M1, wherein data from LCH A and LCH B is included in decreasing priority order and up to Bj (1201). If there is remaining SL grant, UE then schedules data from LCH C and LCH D which are associated with scheduling mode M2, wherein data from LCH C and LCH D is included in decreasing priority order and up to Bj (1202). If there is still remaining SL grant, UE schedules data from all SL LCHs (irrespective of scheduling mode) in decreasing priority order (1203).
  UE has a SL grant for scheduling mode M2. UE generates SL MAC PDU using the data available for transmission in SL LCH(s) of a destination (or of a source and destination pair) and transmits the generated SL MAC PDU using SL grant (or SL SCH resources) for M1. In the SL MAC PDU, UE first schedules data from LCH C and LCH D which are associated with scheduling mode M1, wherein data from LCH C and LCH D is included in decreasing priority order and up to Bj (1211). If there is remaining SL grant, UE then schedules data from LCH C and LCH D which are associated with scheduling mode M2, wherein data from LCH C and LCH D is included in decreasing priority order (1212).

Embodiment 2

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:
  Schedule/include data from SL LCH(s) associated with scheduling mode of the SL grant as follows:
  Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

If the scheduling mode of SL grant is M1 and If 'multilplexingOtherModeAllowed' is configured (multilplexingOtherModeAllowed can be indicated by gNB using RRC signaling message):

If there is remaining SL grant, allocate resources to the SL LCHs with Bj>0 and associated with scheduling mode different from scheduling mode of SL grant in a strict decreasing priority order where SL LCHs are allocated resources up to Bj.

If there is still remaining SL grant, allocate resources to the SL LCHs (irrespective of associated scheduling mode) having data available for transmission in a strict decreasing priority order (regardless of the value of Bj) until either the data for that logical channel or the SL grant is exhausted, whichever comes first. Logical channels configured with equal priority are served equally (or up to UE implementation).

else:
  allocate resources to the SL LCHs associated with scheduling mode of SL grant having data available for transmission in a strict decreasing priority order (regardless of the value of Bj) until either the data for that logical channel or the SL grant is exhausted, whichever comes first. Logical channels configured with equal priority are served equally (or up to UE implementation).

Embodiment 3

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:
  Schedule/include data from SL LCH(s) associated with scheduling mode of the SL grant as follows:
  Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.
  If the scheduling mode of SL grant is M1 and If there is remaining SL grant, allocate resources to the 'SL LCHs with Bj>0 and associated with scheduling mode different from scheduling mode of SL grant and for which multilplexingOtherModeAllowed is configured', in a strict decreasing priority order where SL LCHs are allocated resources up to Bj.
  If there is still remaining SL grant,
  If the scheduling mode of SL grant is M1 and allocate resources to the SL LCHs associated with scheduling mode of SL grant and 'SL LCHs associated with scheduling mode different from scheduling mode of SL grant and for which multilplexingOtherModeAllowed' having data available for transmission in a strict decreasing priority order (regardless of the value of Bj) until either the data for that logical channel or the SL grant is exhausted, whichever comes first. Logical channels configured with equal priority are served equally (or up to UE implementation).
  If the scheduling mode of SL grant is not M1, allocate resources to the SL LCHs associated with scheduling mode of SL grant having data available for transmission in a strict decreasing priority order (regardless of the value of Bj) until either the data for that logical channel or the SL grant is exhausted, whichever comes first. Logical channels configured with equal priority are served equally (or up to UE implementation).

Method 10

Embodiment 1

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation) or both. gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:
  Schedule/include data from SL LCH(s) associated with at least the scheduling mode of the SL grant as follows:
  Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.
  if any resources remain, all the SL LCHs are served in a strict decreasing priority order (regardless of the value of Bj) until either the data for that logical channel or the SL grant is exhausted, whichever comes first. Logical channels configured with equal priority are served equally (or up to UE implementation).

If the scheduling mode of SL grant is M1 and if all data from SL LCHs associated with at least the scheduling mode of the SL grant is scheduled/included AND if there is remaining SL grant: UE schedule/include data from SL LCHs associated with only one scheduling mode which is different from scheduling mode of the SL grant as follows:

Allocate resources to SL LCHs with Bj>0 in decreasing priority, where SL LCHs are allocated resources up to Bj. Parameter Bj is maintained for every SL LCH as specified in TS 38.321.

if any resources remain, all the SL LCHs having data available for transmission are served in a strict decreasing priority order (regardless of the value of Bj) until either the data for that logical channel or the SL grant is exhausted, whichever comes first. Logical channels configured with equal priority are served equally (or up to UE implementation).

FIG. 11 is an example illustration. There are four SL LCHs (LCH A, LCH B, LCH C and LCH D) associated with a destination (or source and destination pair). LCH A and LCH B are associated with scheduling mode M1. LCH D is associated with scheduling mode M2. LCH is associated with scheduling mode M1 and M2.

UE has a SL grant for scheduling mode M1. UE generates SL MAC PDU using the data available for transmission in SL LCH(s) of a destination (or of a source and destination pair) and transmits the generated SL MAC PDU using SL grant (or SL SCH resources) for M1. In the SL MAC PDU, UE first schedules data from LCH A, LCH B and LCH C which are associated with scheduling mode M1 (1301). If all data from LCH A, LCH B and LCH C is scheduled and if there is remaining SL grant, UE schedules data from SL LCH of only M2 i.e., LCH D (1302).

UE has a SL grant for scheduling mode M2. UE generates SL MAC PDU using the data available for transmission in SL LCH(s) of a destination (or of a source and destination pair) and transmits the generated SL MAC PDU using SL grant (or SL SCH resources) for M2. In the SL MAC PDU, UE schedules data from LCH D which are associated with scheduling mode M2 (1311). Note that in this case LCH associated with other scheduling mode i.e., M1 is not included.

Embodiment 2

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation) or both. gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:

Schedule/include data from SL LCH(s) associated with at least the scheduling mode of the SL grant as follows:

Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

if any resources remain, all the SL LCHs having data available for transmission are served in a strict decreasing priority order (regardless of the value of Bj) until either the data for that logical channel or the SL grant is exhausted, whichever comes first. Logical channels configured with equal priority are served equally (or up to UE implementation).

If the scheduling mode of SL grant is M1 and If 'multiplexingOtherModeAllowed' is configured (multilplexingOtherModeAllowed can be indicated by gNB using RRC signaling message):

if all data from SL LCHs associated with at least the scheduling mode of the SL grant is scheduled/included AND if there is remaining SL grant: UE schedule/include data from SL LCHs associated with only one scheduling mode which is different from scheduling mode of the SL grant as follows:

Allocate resources to SL LCHs with Bj>0 in decreasing priority, where SL LCHs are allocated resources up to Bj. Parameter Bj is maintained for every SL LCH as specified in TS 38.321.

if any resources remain, all the SL LCHs having data available for transmission are served in a strict decreasing priority order (regardless of the value of Bj) until either the data for that logical channel or the SL grant is exhausted, whichever comes first. Logical channels configured with equal priority are served equally (or up to UE implementation).

Embodiment 3

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation) or both. gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of selected destination (or of a source and destination pair) in SL MAC PDU as follows:

schedule/include data from SL LCH(s) associated with at least the scheduling mode of the SL grant as follows:

Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

if any resources remain, all the SL LCHs having data available for transmission are served in a strict decreasing priority order (regardless of the value of Bj) until either the data for that logical channel or the SL grant is exhausted, whichever comes first. Logical channels configured with equal priority are served equally (or up to UE implementation).

If the scheduling mode of SL grant is M1 and if all data from SL LCHs associated with at least the scheduling mode of the SL grant is scheduled/included AND if there is remaining SL grant: UE schedule/include data from SL LCHs associated with only one scheduling mode which is different from scheduling mode of the SL grant and for which multilplexingOtherModeAllowed is configured (multilplexingOtherModeAllowed can be indicated by gNB using RRC signaling message, indication can be per SL LCH) as follows:

Allocate resources to SL LCHs with Bj>0 in decreasing priority, where SL LCHs are allocated resources up to Bj. Parameter Bj is maintained for every SL LCH as specified in TS 38.321.

if any resources remain, all the SL LCHs having data available for transmission are served in a strict decreasing priority order (regardless of the value of Bj) until either the data for that logical channel or the SL grant is exhausted, whichever comes first. Logical channels configured with equal priority are served equally (or up to UE implementation).

Method 11

Embodiment 1

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation) or both. gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:

schedule/include data from SL LCH(s) associated with at least scheduling mode of the SL grant as follows:

Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

If there is remaining SL grant:

If the scheduling mode of SL grant is M1, allocate resources to the SL LCHs (irrespective of associated scheduling mode) having data available for transmission in a strict decreasing priority order (regardless of the value of Bj) until either the data for that logical channel or the SL grant is exhausted, whichever comes first. Logical channels configured with equal priority are served equally (or up to UE implementation).

If the scheduling mode of SL grant is not M1, allocate resources to the SL LCHs associated with at least the scheduling mode of SL grant having data available for transmission in a strict decreasing priority order (regardless of the value of Bj) until either the data for that logical channel or the SL grant is exhausted, whichever comes first. Logical channels configured with equal priority are served equally (or up to UE implementation).

Figure 14:
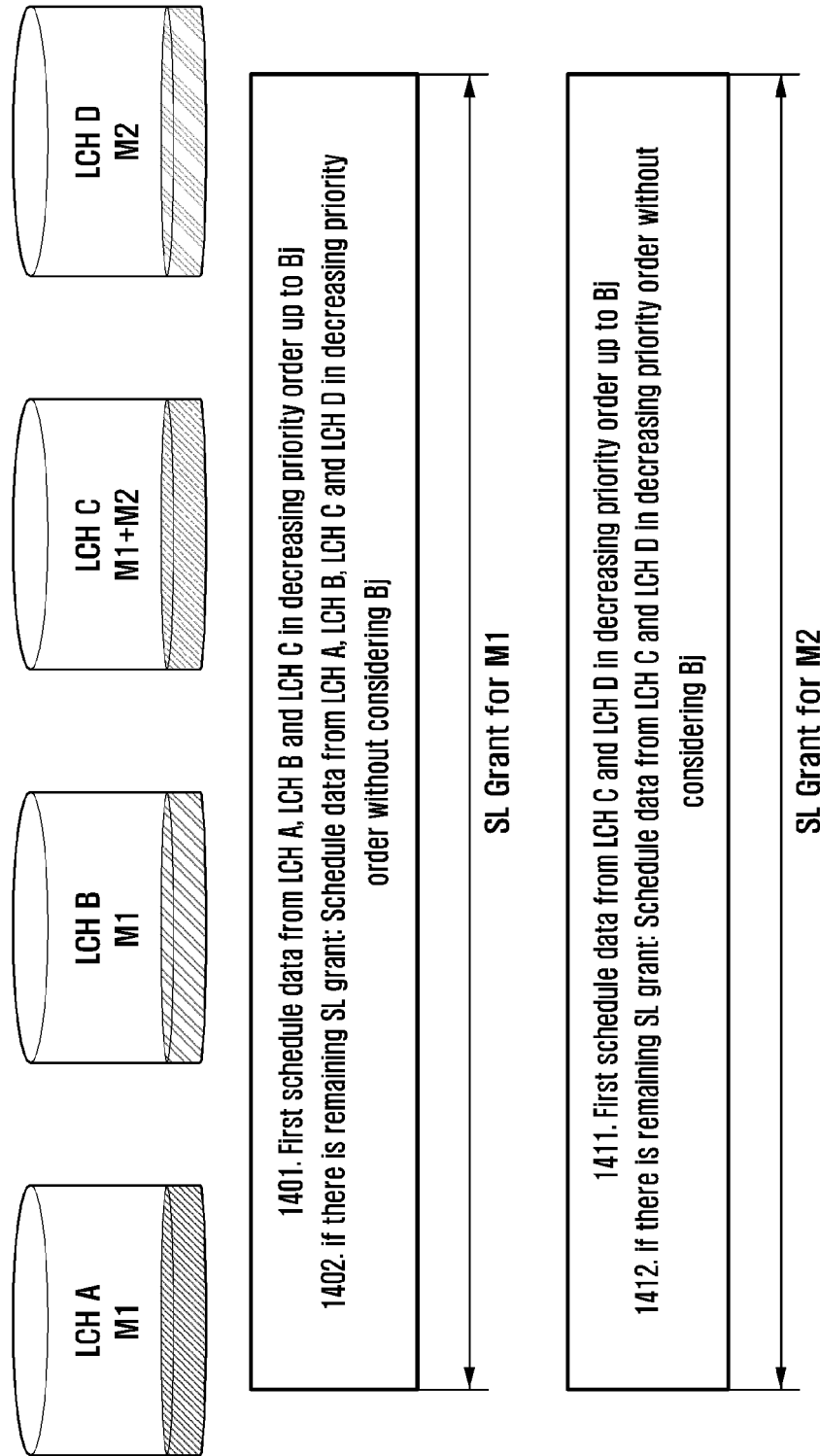

FIG. 14 is an example illustration. There are four SL LCHs (LCH A, LCH B, LCH C and LCH D) associated with a destination (or source and destination pair). LCH A and LCH B are associated with scheduling mode M1. LCH D is associated with scheduling mode M2. LCH C is associated with scheduling mode M1 and M2.

UE has a SL grant for scheduling mode M1. UE generates SL MAC PDU using the data available for transmission in SL LCH(s) of a destination (or of a source and destination pair) and transmits the generated SL MAC PDU using SL grant (or SL SCH resources) for M1. In the SL MAC PDU, UE first schedules data from LCH A, LCH B and LCH C in decreasing priority order up to Bj (1401). If there is remaining SL grant, UE schedules data from LCH A, LCH B, LCH C and LCH D in decreasing priority order without considering Bj (1402).

UE has a SL grant for scheduling mode M2. UE generates SL MAC PDU using the data available for transmission in SL LCH(s) of a destination (or of a source and destination pair) and transmits the generated SL MAC PDU using SL grant (or SL SCH resources) for M2. In the SL MAC PDU, UE first schedules data from LCH C and LCH D in decreasing priority order up to Bj (1411). If there is remaining SL grant, UE schedules data from LCH C and LCH D in decreasing priority order without considering Bj (1412).

Embodiment 2

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:

schedule/include data from SL LCH(s) associated with at least the scheduling mode of the SL grant as follows:

Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

If there is remaining SL grant:

If 'multilplexingOtherModeAllowed' is configured (multilplexingOtherModeAllowed can be indicated by gNB using RRC signaling message) and If the scheduling mode of SL grant is M1:

allocate resources to the SL LCHs (irrespective of associated scheduling mode) having data available for transmission in a strict decreasing priority order (regardless of the value of Bj) until either the data for that logical channel or the SL grant is exhausted, whichever comes first. Logical channels configured with equal priority are served equally (or up to UE implementation).

Else allocate resources to the SL LCHs associated with at least the scheduling mode of SL grant having data available for transmission in a strict decreasing priority order (regardless of the value of Bj) until either the data for that logical channel or the SL grant is exhausted, whichever comes first. Logical channels configured with equal priority are served equally (or up to UE implementation).

Embodiment 3

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation). gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:

schedule/include data from SL LCH(s) associated with at least the scheduling mode of the SL grant as follows:

Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

If there is remaining SL grant:

If the scheduling mode of SL grant is M1:

allocate resources to the SL LCHs associated with at least the scheduling mode of SL grant and SL LCHs associated with only one scheduling mode which is different from scheduling mode of SL grant for which 'multilplexingOtherModeAllowed' is configured having data available for transmission in a strict decreasing priority order (regardless of the value of Bj) until either the data for that logical channel or the SL grant is exhausted, whichever comes first. Logical channels configured with equal priority are served equally (or up to UE implementation).

Else allocate resources to the SL LCHs associated with at least the scheduling mode of SL grant having data available for transmission in a strict decreasing priority order (regardless of the value of Bj) until either the data for that logical channel or the SL grant is exhausted, whichever comes first. Logical channels configured with equal priority are served equally (or up to UE implementation).

Method 12

Embodiment 1

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation) or both. gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:

Schedule/include data from SL LCH(s) associated with at least the scheduling mode of the SL grant as follows:

Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

If the scheduling mode of SL grant is M1 and If there is remaining SL grant, allocate resources to the SL LCHs with Bj>0 and associated with only one scheduling mode which is different from scheduling mode of SL grant in a strict decreasing priority order where SL LCHs are allocated resources up to Bj.

If there is still remaining SL grant,

If the scheduling mode of SL grant is M1, allocate resources to the SL LCHs (irrespective of associated scheduling mode) having data available for transmission in a strict decreasing priority order (regardless of the value of Bj) until either the data for that logical channel or the SL grant is exhausted, whichever comes first. Logical channels configured with equal priority are served equally (or up to UE implementation).

If the scheduling mode of SL grant is not M1, allocate resources to the SL LCHs associated with at least the scheduling mode of SL grant having data available for transmission in a strict decreasing priority order (regardless of the value of Bj) until either the data for that logical channel or the SL grant is exhausted, whichever comes first. Logical channels configured with equal priority are served equally (or up to UE implementation).

Figure 15:
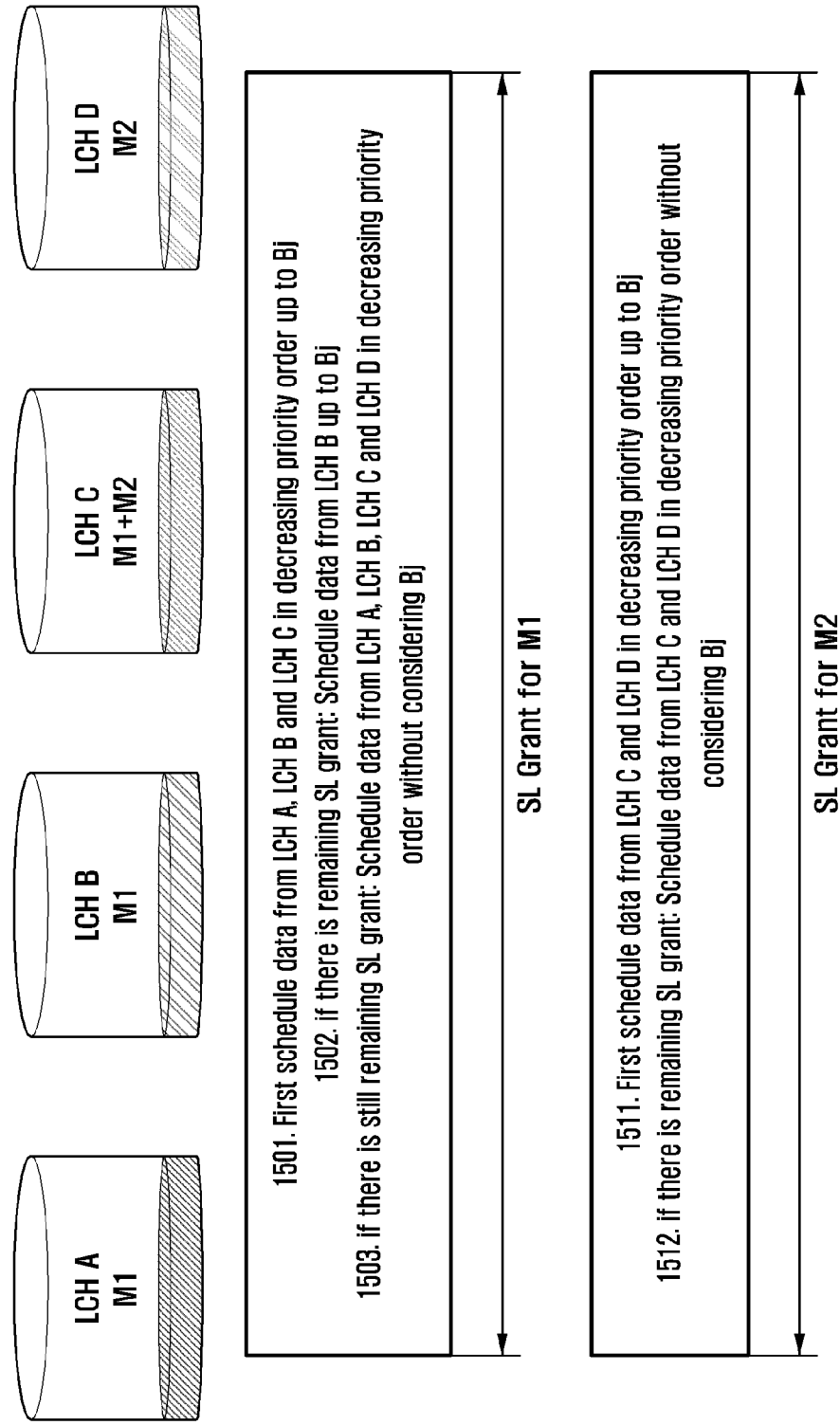

FIG. 15 is an example illustration. There are four SL LCHs (LCH A, LCH B, LCH C and LCH D) associated with a destination (or source and destination pair).

UE has a SL grant for scheduling mode M1. UE generates SL MAC PDU using the data available for transmission in SL LCH(s) of a destination (or of a source and destination pair) and transmits the generated SL MAC PDU using SL grant (or SL SCH resources) for M1. In the SL MAC PDU, UE first schedules data from LCH A, LCH B and LCH C in decreasing priority order up to Bj (1501). If there is remaining SL grant, UE schedules data from LCH B up to Bj (1502). If there is still remaining SL grant, UE schedules data from LCH A, LCH B, LCH C and LCH D in decreasing priority order without considering Bj (1503).

UE has a SL grant for scheduling mode M2. UE generates SL MAC PDU using the data available for transmission in SL LCH(s) of a destination (or of a source and destination pair) and transmits the generated SL MAC PDU using SL grant (or SL SCH resources) for M2. In the SL MAC PDU, UE first schedules data from LCH C and LCH D in decreasing priority order up to Bj (1511). If there is remaining SL grant, UE schedules data from LCH C and LCH D in decreasing priority order without considering Bj (1512).

Embodiment 2

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation) or both. gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:

Schedule/include data from SL LCH(s) associated with at least the scheduling mode of the SL grant as follows:

Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.

If the scheduling mode of SL grant is M1 and If 'multilplexingOtherModeAllowed' is configured (multilplexingOtherModeAllowed can be indicated by gNB using RRC signaling message):

If there is remaining SL grant, allocate resources to the SL LCHs with Bj>0 and associated with only one scheduling mode which is different from scheduling mode of SL grant in a strict decreasing priority order where SL LCHs are allocated resources up to Bj.

If there is still remaining SL grant, allocate resources to the SL LCHs (irrespective of associated scheduling mode) having data available for transmission in a strict decreasing priority order (regardless of the value of Bj) until either the data for that logical channel or the SL grant is exhausted, whichever comes first. Logical channels configured with equal priority are served equally (or up to UE implementation).

else:

allocate resources to the SL LCHs associated with at least the scheduling mode of SL grant having data available for transmission in a strict decreasing priority order (regardless of the value of Bj) until either the data for that logical channel or the SL grant is exhausted, whichever comes first. Logical channels configured with equal priority are served equally (or up to UE implementation).

Embodiment 3

Sidelink logical channels (SL LCHs) or radio bearers are associated with scheduling modes. Each SL LCH is either associated with scheduling mode M1 (i.e., Scheduled Resource Allocation) or mode M2 (i.e., UE autonomous Resource Allocation) or both. gNB signals the associated scheduling mode for each SL LCH (or SL radio bearer). The signaling can be done using RRC signaling message (e.g., RRC Reconfiguration message).

UE generates SL MAC PDU using the data available for transmission in SL LCH(s) of a destination (or of a source and destination pair) and transmits the generated SL MAC PDU using SL grant (or SL SCH resources). The destination (or of a source and destination pair) is selected as specified in TS 38.321.

In one embodiment of this disclosure, for a SL grant, UE includes the data available from various SL LCHs (having data available for transmission) of a destination (or of a source and destination pair) in SL MAC PDU as follows:

Schedule/include data from SL LCH(s) associated with at least the scheduling mode of the SL grant as follows:
Allocate resources to SL MAC CE(s) of selected destination (or source and destination pair) and SL LCHs with Bj>0 in decreasing priority, where SL LCHs are allocated resources up to Bj. Parameter Bj is maintained for every SL LCH as specified in TS 38.321. Alternately, allocate resources to SL LCHs with Bj>0 in decreasing priority, where SL LCHs are allocated resources up to Bj. Alternately, first allocate resources to SL MAC CE(s) of selected destination (or source and destination pair), then allocated resources to SL LCHs with Bj>0 in decreasing priority, where SL LCHs are allocated resources up to Bj.
If the scheduling mode of SL grant is M1 and If there is remaining SL grant, allocate resources to the 'SL LCHs with Bj>0 and associated with only one scheduling mode which is different from scheduling mode of SL grant and for which multilplexingOtherModeAllowed is configured', in a strict decreasing priority order where SL LCHs are allocated resources up to Bj.
If there is still remaining SL grant,
If the scheduling mode of SL grant is M1 and allocate resources to the SL LCHs associated with scheduling mode of SL grant and 'SL LCHs associated with only one scheduling mode which is different from scheduling mode of SL grant and for which multilplexingOtherModeAllowed' having data available for transmission in a strict decreasing priority order (regardless of the value of Bj) until either the data for that logical channel or the SL grant is exhausted, whichever comes first. Logical channels configured with equal priority are served equally (or up to UE implementation).
If the scheduling mode of SL grant is not M1, allocate resources to the SL LCHs associated with at least the scheduling mode of SL grant having data available for transmission in a strict decreasing priority order (regardless of the value of Bj) until either the data for that logical channel or the SL grant is exhausted, whichever comes first. Logical channels configured with equal priority are served equally (or up to UE implementation).

Preambles for Small Data Transmission

For small data transmission, Random Access Procedure is initiated. Upon receiving the random access preamble, gNB should be able to distinguish whether the UE has initiated the random access for small data transmission or not.

In the LTE system, preambles for small data transmission are configured per CE levels. There can be one or more CE levels. The preambles for normal random access (i.e., other than small data transmission) are signaling by eNB using two parameters: firstPreamble and lastPreamble. These parameters are signaled for each CE level. firstPreamble and lastPreamble indicates preamble index. For a given CE level, the preambles from firstPreamble to lastPreamble are used for normal random access. The preambles for random access for small data transmission are indicated by eNB by signaling additional parameter: edt-lastPreamble. For the concerned CE level, if PRACH resources configured for small data transmission are different from the PRACH resources configured for non small data transmission for all CE levels and for small data transmission for all other CE levels, the preambles for small data transmission are the preambles firstPreamble to edt-lastPreamble. Otherwise, the preambles for small data transmission are the preambles lastPreamble+1 to edt-LastPreamble.

In the NR system, the preambles for random access are indicated by gNB by signaling parameters: ssb-perRACH-Occasion and CB-PreamblesPerSSB in RACH configuration. In an UL BWP, 4S RA (4 step random access) for SDT and/or 4S RA for Non SDT (ex. for a normal mobile communication) and/or 2S RA (2 step random access) for SDT and/or 2S RA for non SDT can be configured. ROs may or may not be shared between one or more of these RA types i.e., 4SRA for SDT, 4S RA for Non SDT, 2S RA for SDT, 2S RA for non SDT. The issue is how to determine which preambles/SSB/RO are used for 4S RA SDT and 2S RA SDT. Explicitly indicating each preamble index for each SSB/RO will lead to significant signaling overhead.

Embodiment 1

4 step RACH is configured in the UL BWP and small data transmission is supported using 4 step RACH in the UL BWP. Small data transmission is considered supported using 4 step RACH in the UL BWP, if that UL BWP configuration includes 4 step RACH configuration for small data transmission. UL BWP configuration can be received from gNB in system information or RRC reconfiguration message. Note that here UL BWP refers to BWP on which UE transmits PRACH for small data transmission. This UL BWP can be initial UL BWP or another UL BWP indicated by gNB for small data transmission. 2 step RACH is not configured in this UL BWP (i.e., neither configured for small data transmission, nor for regular 2 step random access). In the below description the parameters correspond to the UL BWP for small data transmission.

For 4 step RACH, if ROs configured for small data transmission are shared with ROs configured for regular 4 step random access (i.e., non small data transmission):

UE determines the starting preamble index for small data transmission as follows:

Starting preamble index (S)=R1, where R1 is CB-PreamblesPerSSB configured (e.g., in the rach-ConfigCommon IE) for regular 4 step random access. N1 is number of SSBs per RACH occasion configured (e.g., in the rach-ConfigCommon IE) for regular 4 step random access.

UE determines preambles for each SSB as follows:

If N1<1: Preambles starting from S to S+CB-PreamblesPerSSB-SDT (X)−1 are used for small data transmission. In other words, X contention based preambles with consecutive indexes associated with the SSB per valid PRACH occasion start from S.

If N1>=1, X contention based preambles with consecutive indexes associated with SS/PBCH block n, 0≤n≤N1−1, per valid PRACH occasion start from preamble index 'S+n·$N_{preamble}^{total}$/N1, where $N_{preamble}^{total}$ is provided by totalNumberOfRA-Preambles. totalNumberOfRA-Preambles is the total number of RA preambles configured for regular random access.

Figure 16:
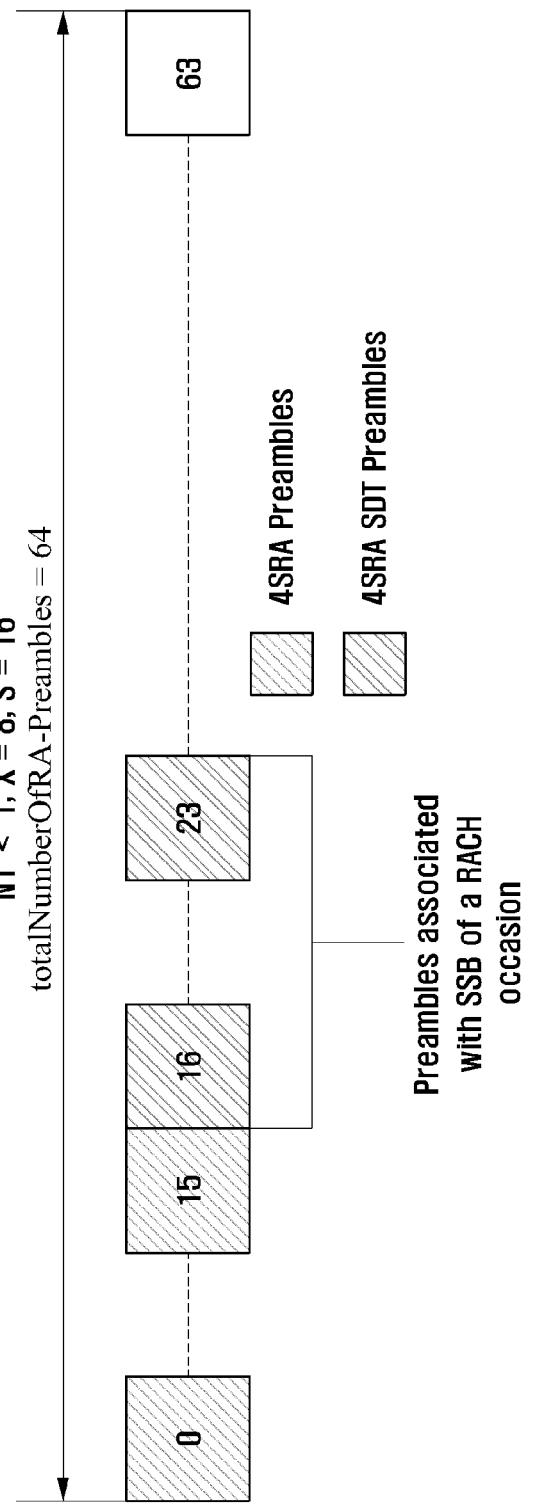
FIGS. 16-25 each illustrate examples of preambles according to embodiments of the disclosure.
Figure 17:
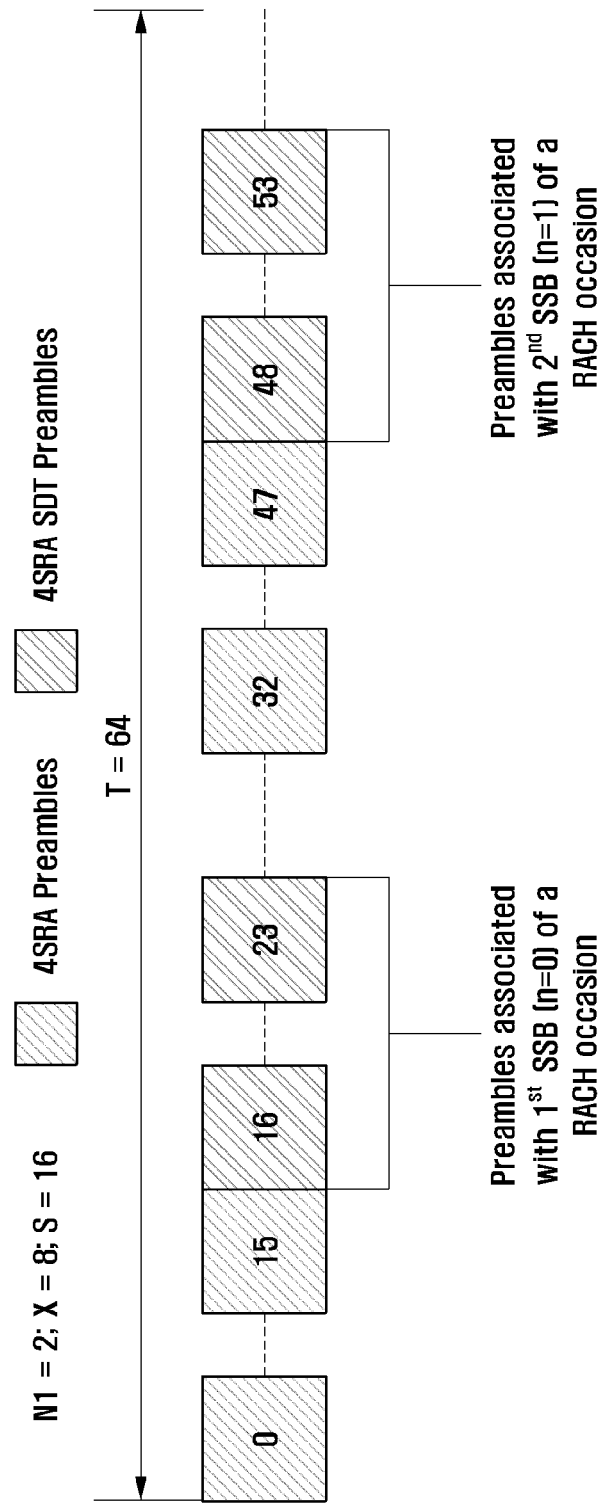

FIG. 16 and FIG. 17 are example illustrations.

In an embodiment, if prach-ConfigIndex is not signaled by gNB for small data transmission, UE uses the prach-ConfigIndex configured for regular random access to determine ROs. This means that if prach-ConfigIndex is not signaled for small data transmission, ROs configured for small data transmission are shared with ROs configured for regular random access (i.e., non small data transmission).

For 4 step RACH, if ROs configured for small data transmission are not shared with ROs configured for regular 4 step random access (i.e., non small data transmission):

UE first determine starting preamble index for small data transmission as follows:

Starting preamble index (S)=0.

CB-PreamblesPerSSB-SDT (X) and ssb-perRACH-Occasion-SDT (Y) is configured/signaled (e.g., in the rach-ConfigCommon-SDT IE) by gNB for small data transmission using 4 step RACH.

UE then determine preambles for each SSB as follows:

If Y<1: Preambles starting from S to S+CB-PreamblesPerSSB-SDT (X)−1 are used for small data transmission. In other words, X contention based preambles with consecutive indexes associated with the SSB per valid PRACH occasion start from S.

If Y>=1, X contention based preambles with consecutive indexes associated with SS/PBCH block n, 0≤n≤Y−1, per valid PRACH occasion start from preamble index 'S+n·$N_{preamble}^{total}$/Y, where $N_{preamble}^{total}$ is provided by totalNumberOfRA-Preambles-SDT. totalNumberOfRA-Preambles-SDT is the total number of RA preambles configured for small data transmission.

In an embodiment, if prach-ConfigIndex is signaled for small data transmission, UE uses the prach-ConfigIndex configured for small data transmission to determine ROs. This means that if prach-ConfigIndex is signaled for small data transmission, ROs configured for small data transmission are not shared with ROs configured for regular random access (i.e., non small data transmission)

During the random access procedure initiated for small data transmission, for each random access attempt, UE first select SSB (SSB with highest SS-RSRP or SSB with SS-RSRP above a configured threshold or any SSB if there is no SSB with SS-RSRP above threshold) and then preamble and RO corresponding to selected SSB wherein preamble is selected from set of preambles corresponding to the selected SSB as determined above. Mapping between ROs and SSBs is determined as in regular random access procedure. UE then transmit selected PRACH preamble and selected RO.

Embodiment 2

2 step RACH is configured in the UL BWP and small data transmission is supported using 2 step RACH in the UL BWP. Small data transmission is considered supported using 2 step RACH in the UL BWP, if that UL BWP configuration includes 2 step RACH configuration for small data transmission. UL BWP configuration can be received from gNB in system information or RRC reconfiguration message. Note that here UL BWP refers to BWP on which UE transmits PRACH for small data transmission. This UL BWP can be initial UL BWP or another UL BWP indicated by gNB for small data transmission. 4 step RACH is not configured in this UL BWP (i.e., neither configured for small data transmission, nor for regular 4 step random access). In the below description the parameters correspond to the UL BWP for small data transmission.

For 2 step RACH, if ROs configured for small data transmission are shared with ROs configured for regular 2 step random access (i.e., non small data transmission):

UE determines the starting preamble index for small data transmission as follows:

Starting preamble index (S)=R1, where R1 is CB-PreamblesPerSSB configured (e.g., in the rach-ConfigCommon2Step IE) for regular 2 step random access. N1 is ssb-perRACH-Occasion CB-PreamblesPerSSB-SDT (X) is configured/signaled (e.g., in the rach-ConfigCommon2Step-SDT IE) by gNB for small data transmission using 2 step RACH.

UE determines preambles for each SSB as follows:

If N1<1: Preambles starting from S to S+CB-PreamblesPerSSB-SDT (X)−1 are used for small data transmission. In other words, X contention based preambles with consecutive indexes associated with the SSB per valid PRACH occasion start from S.

If N1>=1, X contention based preambles with consecutive indexes associated with SS/PBCH block n, 0≤n≤N1−1, per valid PRACH occasion start from preamble index 'S+n·$N_{preamble}^{total}$/N1, where $N_{preamble}^{total}$ is provided by totalNumberOfRA-Preambles. totalNumberOfRA-Preambles is the total number of RA preambles configured for regular 2 step random access.

Figure 18:
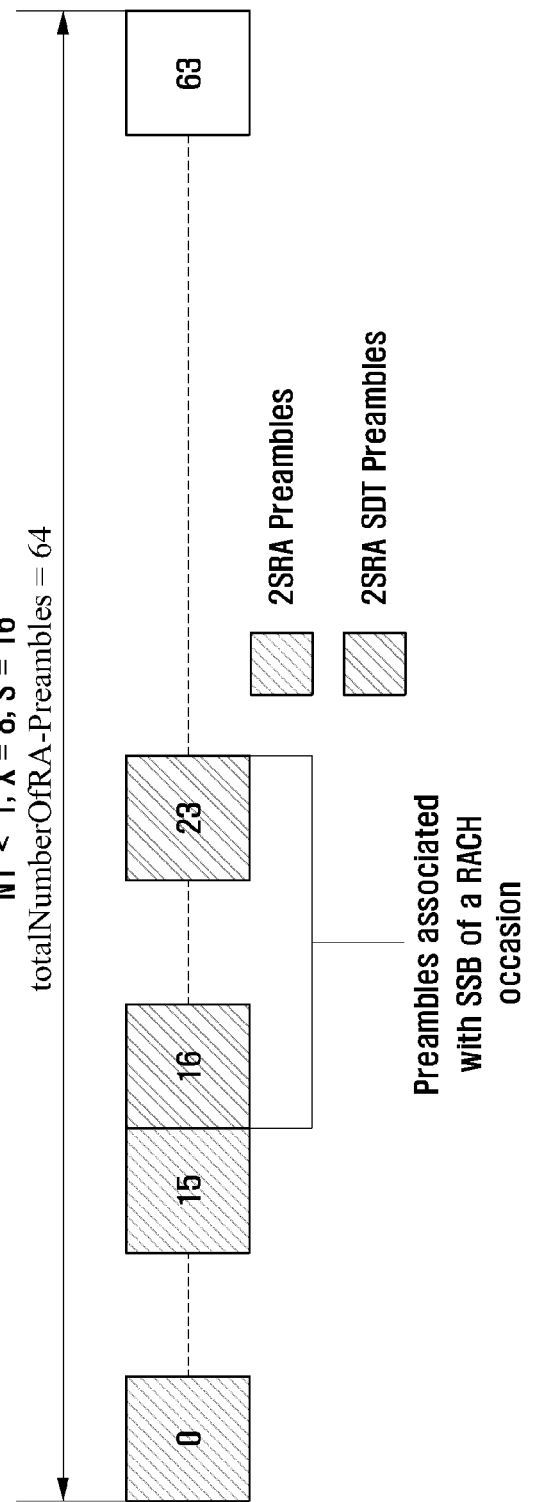
Figure 19:
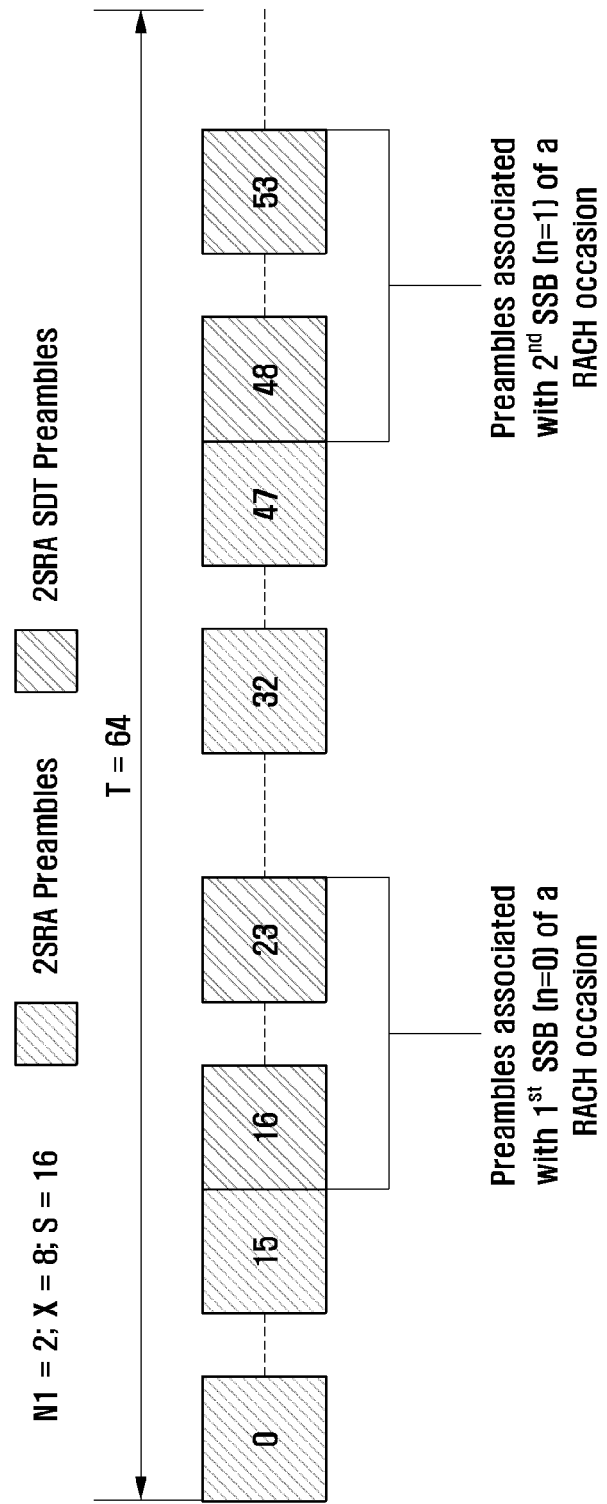

FIG. 18 and FIG. 19 are example illustrations.

In an embodiment, if prach-ConfigIndex is not signaled for small data transmission, UE uses the prach-ConfigIndex configured for regular 2 step random access to determine ROs. This means that if prach-ConfigIndex is not signaled for small data transmission, ROs configured for small data transmission are shared with ROs configured for regular 2 step random access (i.e., non small data transmission)

For 2 step RACH, if ROs configured for small data transmission are not shared with ROs configured for regular 2 step random access (i.e., non small data transmission):

UE determines the starting preamble index for small data transmission as follows:

Starting preamble index (S)=0.

CB-PreamblesPerSSB-SDT (X) and ssb-perRACH-Occasion-SDT (Y) is configured/signaled (e.g., in the rach-ConfigCommon2Step-SDT IE) by gNB for small data transmission using 2 step RACH.

UE determines preambles for each SSB as follows:

If Y<1: Preambles starting from S to S+CB-PreamblesPerSSB-SDT (X)−1 are used for small data transmission. In other words, X contention based preambles with consecutive indexes associated with the SSB per valid PRACH occasion start from S.

If Y>=1, X contention based preambles with consecutive indexes associated with SS/PBCH block n, 0≤n≤Y−1, per valid PRACH occasion start from preamble index 'S+n·$N_{preamble}^{total}$/Y, where $N_{preamble}^{total}$ is provided by totalNumberOfRA-Preambles-SDT. totalNumberOfRA-Preambles-SDT is the total number of RA preambles configured for small data transmission.

In an embodiment, if prach-ConfigIndex is signaled for small data transmission, UE uses the prach-ConfigIndex configured for small data transmission to determine ROs. This means that if prach-ConfigIndex is signaled for small data transmission, ROs configured for small data transmission are not shared with ROs configured for regular 2 step random access (i.e., non small data transmission).

During the random access procedure initiated for small data transmission, for each random access attempt UE first select SSB (SSB with highest SS-RSRP or SSB with SS-RSRP above a configured threshold or any SSB if there is no SSB with SS-RSRP above threshold) and then preamble and RO corresponding to selected SSB wherein preamble is selected from set of preambles determined above corresponding to the selected SSB. Mapping between ROs and SSBs is determined as in regular random access procedure. UE then transmit selected PRACH preamble and selected RO. UE shall also select PUSCH occasion from PUSCH occasions configured for small data transmission and transmit MsgA MAC PDU which include small data i.e., MAC SDU(s) for DRB.

Embodiment 3

Both 2 step and 4 step RACH are configured in the UL BWP. ROs are shared between 2 step and 4 step RACH. Small data transmission is supported in the UL BWP. This UL BWP can be initial UL BWP or another UL BWP indicated by gNB for small data transmission.

Case 1: Small data transmission is supported in the UL BWP using 4 step RACH and not supported for 2 step RACH.

For 4 step RACH, if ROs configured for small data transmission are shared with ROs configured for regular random access (i.e., non small data transmission):

UE determines the starting preamble index for small data transmission as follows:

Starting preamble index (S)=R1+R2, where N1 is ssb-perRACH-Occasion and R1 is CB-PreamblesPerSSB configured (e.g., in the rach-ConfigCommon IE) for regular 4 step random access, R2 is CB-PreamblesPerSSB configured (e.g., in the rach-ConfigCommon2Step IE) for regular 2 step random access CB-PreamblesPerSSB-SDT (X) is configured/signaled (e.g., in the rach-ConfigCommon-SDT IE) by gNB for small data transmission using 4 step RACH.

UE determines preambles for each SSB as follows:

If N1<1: Preambles starting from S to S+CB-PreamblesPerSSB-SDT (X)−1 are used for small data transmission. In other words, X contention based preambles with consecutive indexes associated with the SSB per valid PRACH occasion start from S.

If N1>=1, X contention based preambles with consecutive indexes associated with SS/PBCH block n, 0≤n≤N1−1, per valid PRACH occasion start from preamble index 'S+n·$N_{preamble}^{total}$/N1, where $N_{preamble}^{total}$ is provided by totalNumberOfRA-Preambles. totalNumberOfRA-Preambles is the total number of RA preambles configured for regular random access in the rach-ConfigCommon IE.

Figure 20:
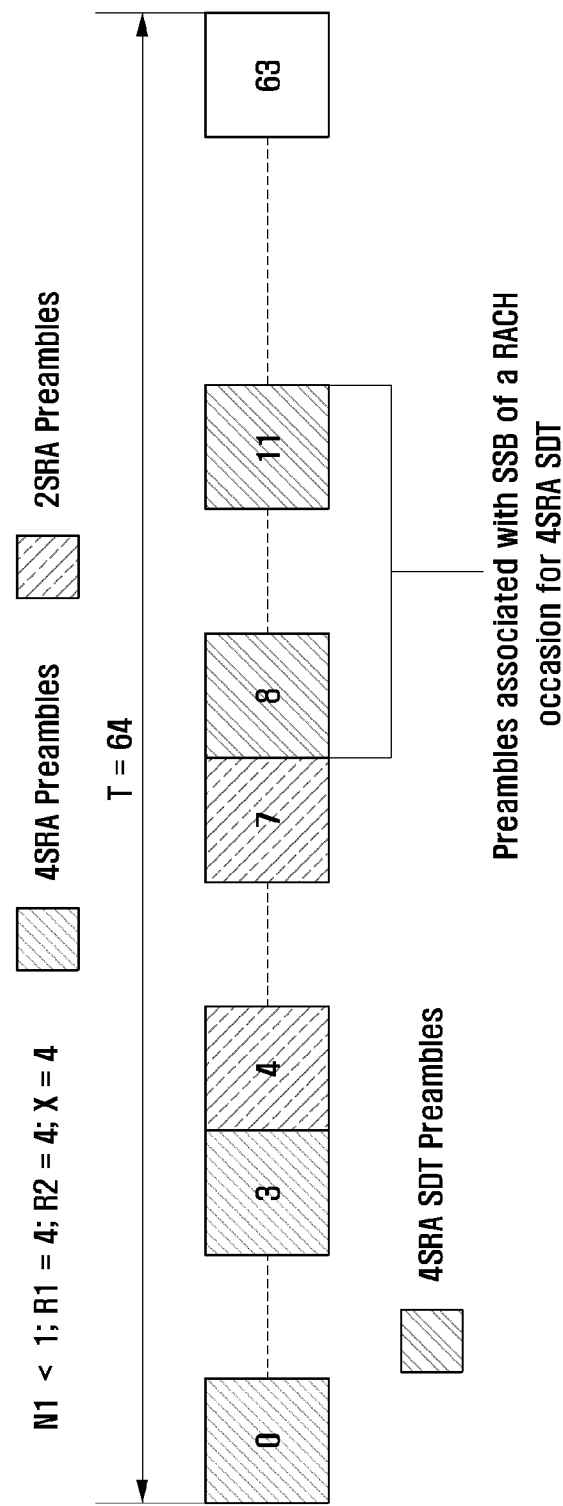
Figure 21:
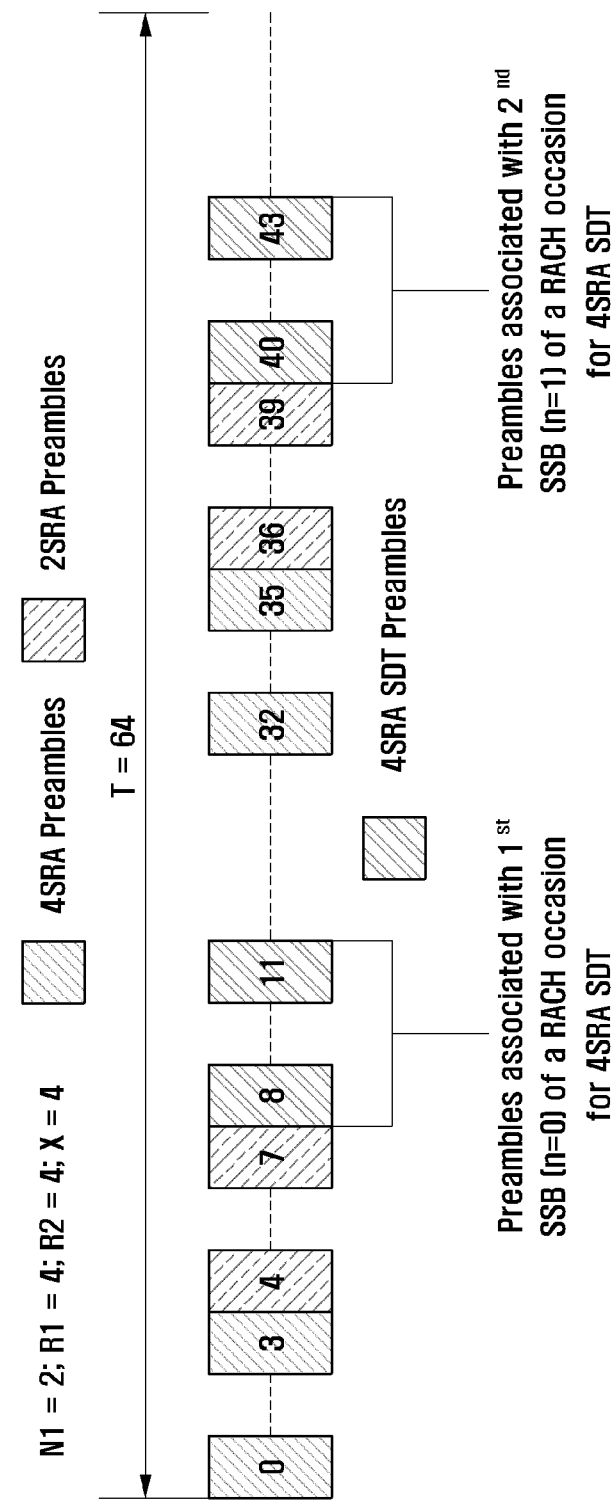

FIG. 20 and FIG. 21 are example illustrations.

In an embodiment, if prach-ConfigIndex is not signaled for small data transmission, UE uses the prach-ConfigIndex configured for regular 4 step random access to determine ROs. This means that if prach-ConfigIndex is not signaled for small data transmission, ROs configured for small data transmission are shared with ROs configured for regular random access (i.e., non small data transmission).

For 4 step RACH, if ROs configured for small data transmission are not shared with ROs configured for regular random access (i.e., non small data transmission):

UE determines the starting preamble index for small data transmission as follows:

Starting preamble index (S)=0.

CB-PreamblesPerSSB-SDT (X) and ssb-perRACH-Occasion-SDT (Y) is configured/signaled (e.g., in the rach-ConfigCommon-SDT IE) by gNB for small data transmission using 4 step RACH.

UE determines preambles for each SSB as follows:

If Y<1: Preambles starting from S to S+CB-PreamblesPerSSB-SDT (X)−1 are used for small data transmission. In other words, X contention based preambles with consecutive indexes associated with the SSB per valid PRACH occasion start from S.

If Y>=1, X contention based preambles with consecutive indexes associated with SS/PBCH block n, 0≤n≤Y−1, per valid PRACH occasion start from preamble index 'S+n·$N_{preamble}^{total}$/Y, where $N_{preamble}^{total}$ preamble is provided by totalNumberOfRA-Preambles-SDT. totalNumberOfRA-Preambles-SDT is the total number of RA preambles configured for small data transmission.

In an embodiment, if prach-ConfigIndex is signaled for small data transmission, UE uses the prach-ConfigIndex configured for small data transmission to determine ROs. This means that if prach-ConfigIndex is signaled for small data transmission, ROs configured for small data transmission are not shared with ROs configured for regular random access (i.e., non small data transmission).

During the random access procedure initiated for small data transmission, for each random access attempt UE first select SSB (SSB with highest SS-RSRP or SSB with SS-RSRP above a configured threshold or any SSB if there is no SSB with SS-RSRP above threshold as specified in TS 38.321) and then preamble and RO corresponding to selected SSB wherein preamble is selected from set of preambles corresponding to selected SSB as determined above. UE then transmit selected PRACH preamble and selected RO.

Case 2: Small data transmission is supported in the UL BWP using 2 step RACH and not supported for 4 step RACH.

For 2 step RACH, if ROs configured for small data transmission are shared with ROs configured for regular 2 step random access (i.e., non small data transmission):

UE can determine the preambles for small data transmission as follows:

Starting preamble index (S)=R1+R2, where N1 is ssb-perRACH-Occasion and R1 is CB-PreamblesPerSSB configured (e.g., in the rach-ConfigCommon IE) for regular 4 step random access, R2 is CB-PreamblesPerSSB configured (e.g., in the rach-ConfigCommon2Step IE) for regular 2 step random access CB-PreamblesPerSSB-SDT (X) is configured/signaled (e.g., in the rach-ConfigCommon2Step-SDT IE) by gNB for small data transmission using 2 step RACH.

UE can determine preambles for each SSB as follows:

If N1<1: Preambles starting from S to S+CB-PreamblesPerSSB-SDT (X)−1 are used for small data transmission. In other words, X contention based preambles with consecutive indexes associated with the SSB per valid PRACH occasion start from S.

If N1>=1, X contention based preambles with consecutive indexes associated with SS/PBCH block n, 0≤n≤N1−1, per valid PRACH occasion start from preamble index 'S+n·$N_{preamble}^{total}$/N1, where $N_{preamble}^{total}$ is provided by totalNumberOfRA-Preambles. totalNumberOfRA-Preambles is the total number of RA preambles configured for regular random access in the rach-ConfigCommon IE.

Figure 22:
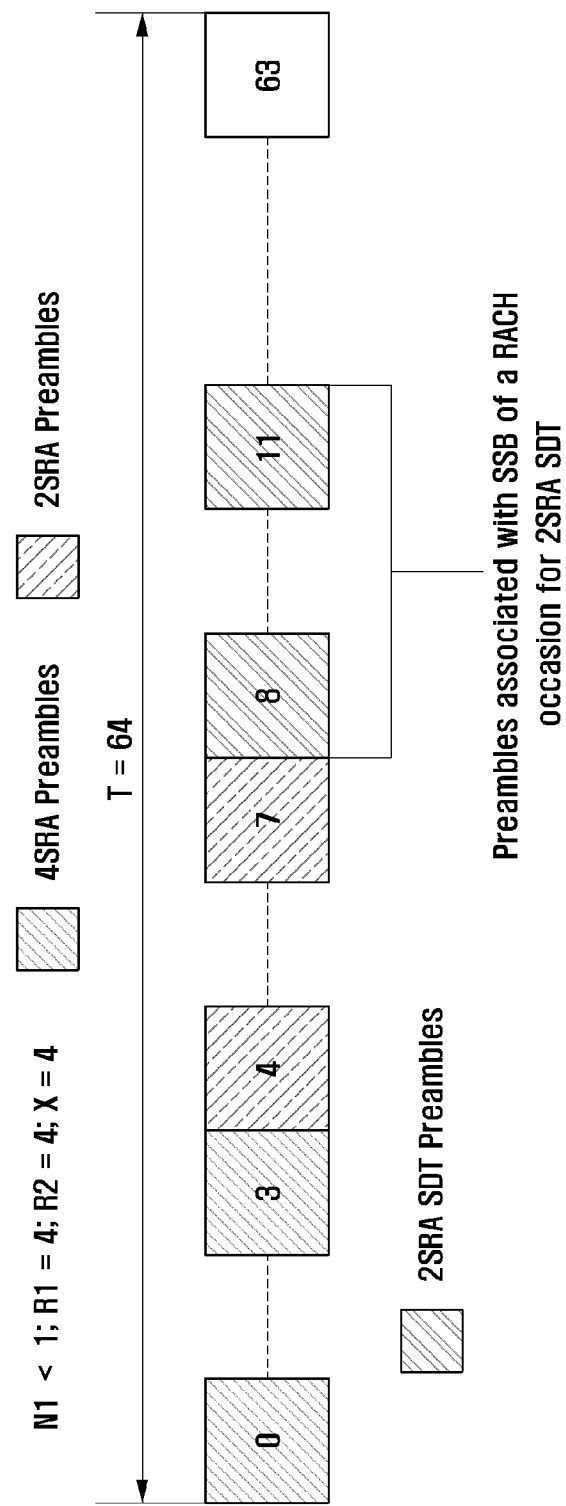
Figure 23:
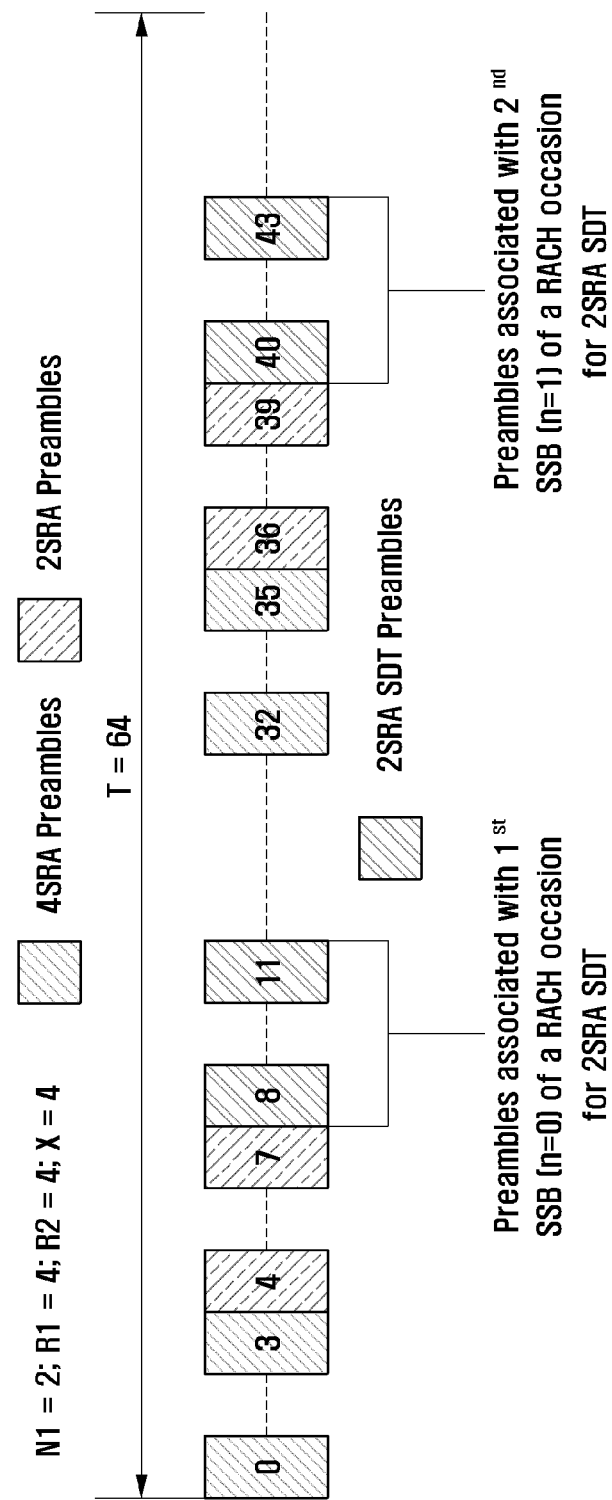

FIG. 22 and FIG. 23 are example illustrations.

In an embodiment, if prach-ConfigIndex is not signaled for small data transmission, UE uses the prach-ConfigIndex configured for regular 2 step random access to determine ROs. This means that if prach-ConfigIndex is not signaled for small data transmission, ROs configured for small data transmission are shared with ROs configured for regular 2 step random access (i.e., non small data transmission).

For 2 step RACH, if ROs configured for small data transmission are not shared with ROs configured for regular 2 step random access (i.e., non small data transmission):

UE determines the starting preamble index for small data transmission as follows:

Starting preamble index (S)=0.

CB-PreamblesPerSSB-SDT (X) and ssb-perRACH-Occasion-SDT (Y) is configured/signaled (e.g., in the rach-ConfigCommon2Step-SDT IE) by gNB for small data transmission using 2 step RACH.

UE determines preambles for each SSB as follows:

If Y<1: Preambles starting from S to S+CB-PreamblesPerSSB-SDT (X)−1 are used for small data transmission. In other words, X contention based preambles with consecutive indexes associated with the SSB per valid PRACH occasion start from S.

If Y>=1, X contention based preambles with consecutive indexes associated with SS/PBCH block n, 0≤n≤Y−1, per valid PRACH occasion start from preamble index 'S+n·$N_{preamble}^{total}$/Y, where $N_{preamble}^{total}$ is provided by totalNumberofRA-Preambles-SDT. totalNumberOfRA-Preambles-SDT is the total number of RA preambles configured for small data transmission.

In an embodiment, if prach-ConfigIndex is signaled for small data transmission, UE uses the prach-ConfigIndex configured for small data transmission to determine ROs. This means that if prach-ConfigIndex is signaled for small data transmission, ROs configured for small data transmission are not shared with ROs configured for regular 2 step random access (i.e., non small data transmission).

During the random access procedure initiated for small data transmission, for each random access attempt, UE first select SSB (SSB with highest SS-RSRP or SSB with SS-RSRP above a configured threshold or any SSB if there is no SSB with SS-RSRP above threshold) and then preamble and RO corresponding to selected SSB wherein preamble is selected from set of preambles corresponding to selected SSB as determined above. UE then transmit selected PRACH preamble and selected RO. UE shall also select PUSCH occasion from PUSCH occasions configured for small data transmission and transmit MsgA MAC PDU which include small data i.e., MAC SDU(s) for DRB.

Case 3: Small data transmission is supported in the UL BWP using both 2 step RACH and 4 step RACH.

If ROs configured for small data transmission are shared with ROs configured for regular random access (i.e., non small data transmission):

For small data transmission using 4 step RACH:

UE determines the starting preamble index for small data transmission as follows:

Starting preamble index (S)=R1+R2, where N1 is ssb-perRACH-Occasion and R1 is CB-PreamblesPerSSB configured (e.g., in the rach-ConfigCommon IE) for regular 4 step random access, R2 is CB-PreamblesPerSSB configured (e.g., in the rach-ConfigCommon2Step IE) for regular 2 step random access CB-PreamblesPerSSB-SDT (X) is configured/signaled (e.g., in the rach-ConfigCommon-SDT IE) by gNB for small data transmission using 4 step RACH.

(Alternate) Starting preamble index (S)=R1+R2+R3, where N1 is ssb-perRACH-Occasion and R1 is CB-PreamblesPerSSB configured (e.g., in the rach-ConfigCommon IE) for regular 4 step random access, R2 is CB-PreamblesPerSSB configured (e.g., in the rach-ConfigCommon2Step IE) for regular 2 step random access and R3 is CB-PreamblesPerSSB configured (e.g., in the rach-ConfigCommon2Step IE) for small data transmission using 2 step RACH.

UE determines preambles for each SSB as follows:

If N1<1: Preambles starting from S to S+CB-PreamblesPerSSB-SDT (X)−1 are used for small data transmission. In other words, X contention based preambles with consecutive indexes associated with the SSB per valid PRACH occasion start from S.

If N1>=1, X contention based preambles with consecutive indexes associated with SS/PBCH block n, 0≤n≤N1−1, per valid PRACH occasion start from preamble index 'S+n·$N_{preamble}^{total}$/N1, where $N_{preamble}^{total}$ is provided by totalNumberOfRA-Preambles. totalNumberOfRA-Preambles is the total number of RA preambles configured for regular random access in the rach-ConfigCommon IE.

FIG. 22 and FIG. 23 are example illustrations.

In an embodiment, if prach-ConfigIndex is not signaled for small data transmission, UE uses the prach-ConfigIndex configured for regular 4 step random access to determine ROs. This means that if prach-ConfigIndex is not signaled for small data transmission, ROs configured for small data transmission are shared with ROs configured for regular random access (i.e., non small data transmission).

For small data transmission using 2 step RACH:

UE determines the starting preamble index for small data transmission as follows:

Starting preamble index (S)=R1+R2+R3, where N1 is ssb-perRACH-Occasion and R1 is CB-PreamblesPerSSB configured (e.g., in the rach-ConfigCommon IE) for regular 4 step random access, R2 is CB-PreamblesPerSSB configured (e.g., in the rach-ConfigCommon2Step IE) for regular 2 step random access and R3 is CB-PreamblesPerSSB configured (e.g., in the rach-ConfigCommon2Step IE) for small data transmission using 4 step RACH.

(Alternate): Starting preamble index (S)=R1+R2, where N1 is ssb-perRACH-Occasion and R1 is CB-PreamblesPerSSB configured (e.g., in the rach-ConfigCommon IE) for regular 4 step random access, R2 is CB-PreamblesPerSSB configured (e.g., in the rach-ConfigCommon2Step IE) for regular 2 step random access.

CB-PreamblesPerSSB2Step-SDT (X) is configured/signaled (e.g., in the rach-ConfigCommon2Step-SDT IE) by gNB for small data transmission using 2 step RACH.

UE determines preambles for each SSB as follows:

If N1<1: Preambles starting from S to S+CB-PreamblesPerSSB2Step-SDT (X)−1 are used for small data transmission. In other words, X contention based preambles with consecutive indexes associated with the SSB per valid PRACH occasion start from S.

If N1>=1, X contention based preambles with consecutive indexes associated with SS/PBCH block n, 0≤n≤N1−1, per valid PRACH occasion start from preamble index 'S+n·$N_{preamble}^{total}$/N1, where $N_{preamble}^{total}$ is provided by totalNumberOfRA-Preambles. totalNumberOfRA-Preambles is the total number of RA preambles configured for regular random access in the rach-ConfigCommon IE.

Figure 24:
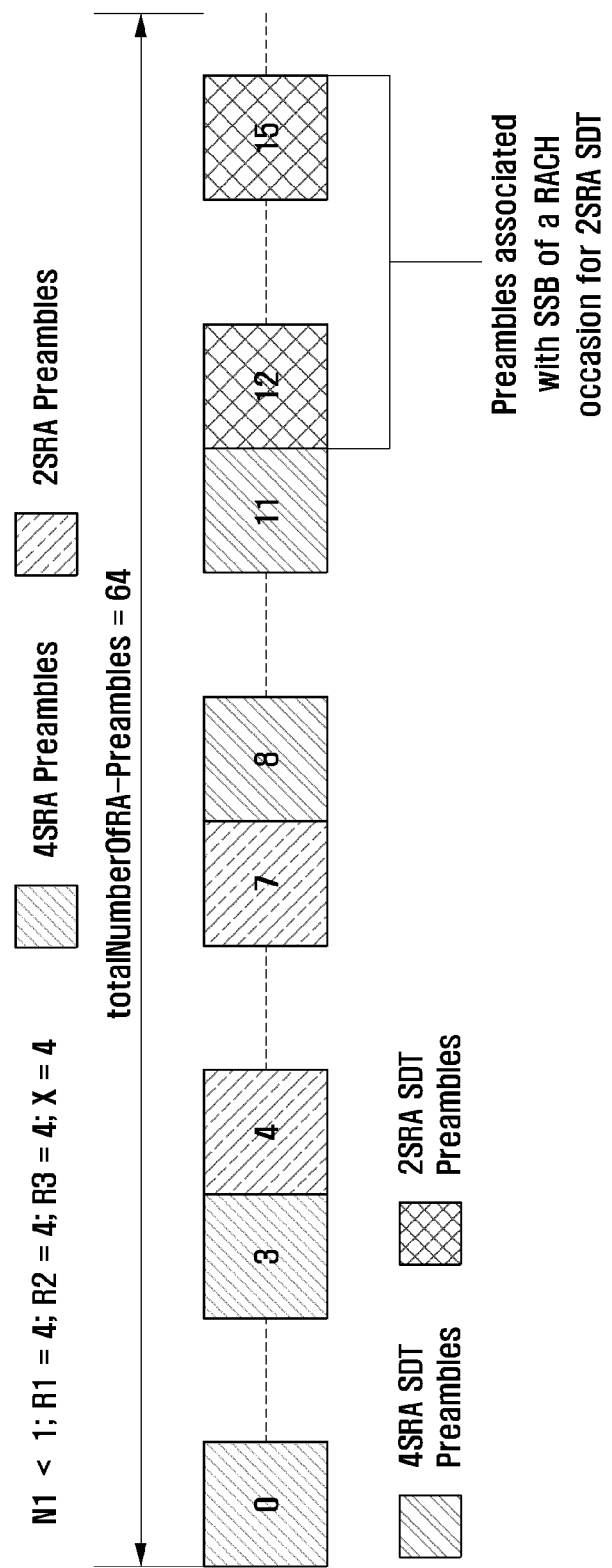
Figure 25:
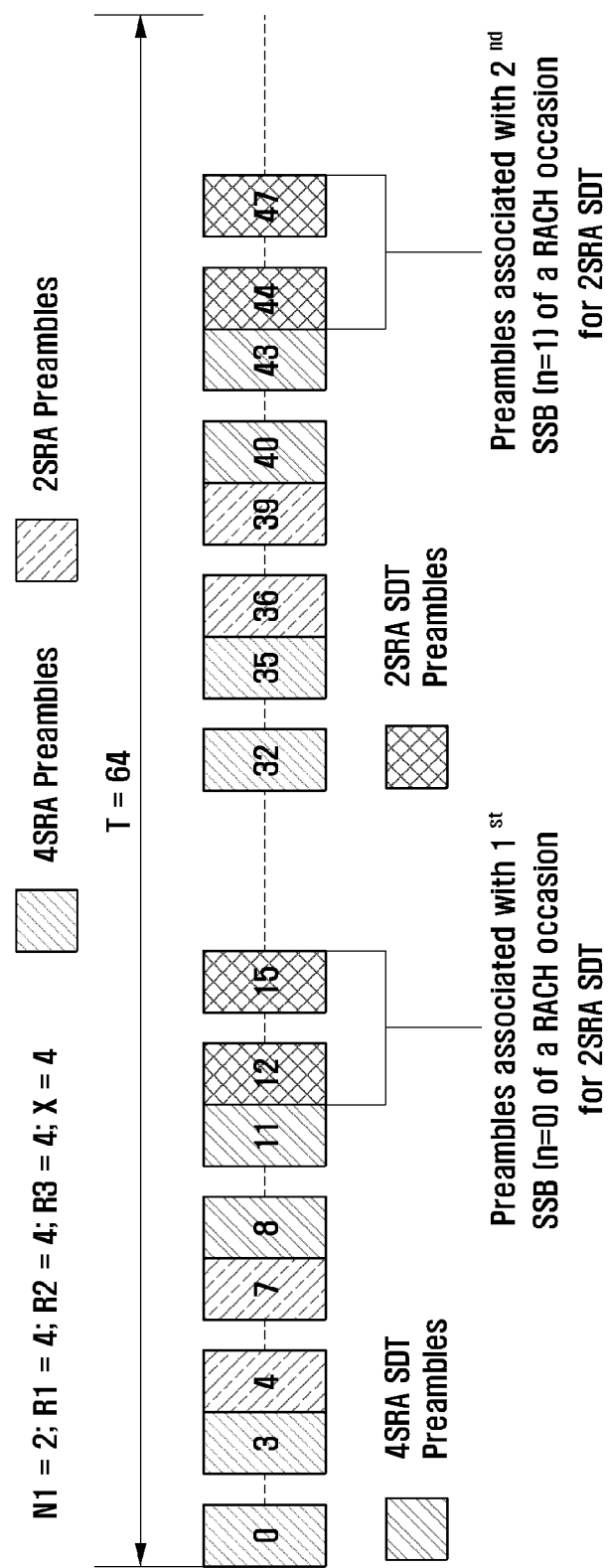

FIG. 24 and FIG. 25 are example illustrations.

In an embodiment, if prach-ConfigIndex is not signaled for small data transmission, UE uses the prach-ConfigIndex configured for regular 4 step random access to determine ROs. This means that if prach-ConfigIndex is not signaled for small data transmission, ROs configured for small data transmission are shared with ROs configured for regular random access (i.e., non small data transmission).

For small data transmission using 4 step RACH, if ROs configured for small data transmission are not shared with ROs configured for regular random access (i.e., non small data transmission) and also not shared with ROs configured for small data transmission using 2 step RACH:

UE determine the starting preamble index for small data transmission as follows:

Starting preamble index (S)=0.

CB-PreamblesPerSSB-SDT (X) and ssb-perRACH-Occasion-SDT (Y) is configured/signaled (e.g., in the rach-ConfigCommon-SDT IE) by gNB for small data transmission.

UE determines preambles for each SSB as follows:

If Y<1: Preambles starting from S to S+CB-PreamblesPerSSB-SDT (X)−1 are used for small data transmission. In other words, X contention based preambles with consecutive indexes associated with the SSB per valid PRACH occasion start from S.

If Y>=1, X contention based preambles with consecutive indexes associated with SS/PBCH block n, 0≤n≤Y−1, per valid PRACH occasion start from preamble index 'S+n·$N_{preamble}^{total}$/Y, where $N_{preamble}^{total}$ is provided by totalNumberOfRA-Preambles-SDT. totalNumberOfRA-Preambles-SDT is the total number of RA preambles configured for small data transmission.

In an embodiment, if prach-ConfigIndex is signaled for small data transmission, UE uses the prach-ConfigIndex configured for small data transmission to determine ROs. This means that if prach-ConfigIndex is signaled for small data transmission, ROs configured for small data transmission are not shared with ROs configured for regular random access (i.e., non small data transmission).

For small data transmission using 2 step RACH, if ROs configured for small data transmission are not shared with ROs configured for regular random access (i.e., non small data transmission) and also not shared with ROs configured for small data transmission using 4 step RACH:

UE determines the starting preamble index for small data transmission as follows:

Starting preamble index (S)=0.

CB-PreamblesPerSSB2Step-SDT (X) and ssb-perRACH-Occasion2Step-SDT (Y) is configured/signaled (e.g., in the rach-ConfigCommon2Step-SDT IE) by gNB for small data transmission using 2 step RACH.

UE determines preambles for each SSB as follows:

If Y<1: Preambles starting from S to S+CB-PreamblesPerSSB2Step-SDT (X)−1 are used for small data transmission. In other words, X contention based preambles with consecutive indexes associated with the SSB per valid PRACH occasion start from S.

If Y>=1, X contention based preambles with consecutive indexes associated with SS/PBCH block n, 0≤n≤Y−1, per valid PRACH occasion start from preamble index 'S+n·$N_{preamble}^{total}$/Y, where $N_{preamble}^{total}$ is provided by totalNumberOfRA-Preambles-SDT. totalNumberOfRA-Preambles-SDT is the total number of RA preambles configured for small data transmission.

In an embodiment, if prach-ConfigIndex is signaled for small data transmission, UE uses the prach-ConfigIndex configured for small data transmission to determine ROs. This means that if prach-ConfigIndex is signaled for small data transmission, ROs configured for small data transmission are not shared with ROs configured for regular random access (i.e., non small data transmission).

Embodiment 4

Both 2 step and 4 step RACH are configured in the UL BWP. ROs are not shared between 2 step and 4 step RACH. Small data transmission is supported in the UL BWP. This UL BWP can be initial UL BWP or another UL BWP indicated by gNB for small data transmission.

For small data transmission using 4 step RACH, operation is same as described in embodiment 1.

For small data transmission using 2 step RACH, operation is same as described in embodiment 2.

Embodiment 5

For small data transmission using 4 step RACH, following parameters are signaled by gNB. These parameters can be signaled in rach-ConfigCommon4Step-SDT IE or in rach-ConfigCommon IE.

startingPreambleIndex4Step-SDT (S)
ssb-perRACH-Occasion4Step-SDT (Y)
CB-PreamblesPerSSB4 Step-SDT (X)

If startingPreambleIndex4Step-SDT is not configured (in UL BWP on which UE transmits PRACH for small data transmission), UE assumes startingPreambleIndex4Step-SDT is zero. Network may not configure startingPreambleIndex4Step-SDT if ROs for SDT are not shared with ROs for non SDT. If ssb-perRACH-Occasion4Step-SDT is not configured (in UL BWP on which UE transmits PRACH for small data transmission), the value of ssb-perRACH-Occasion4Step-SDT is equal to ssb-perRACH-Occasion configured for 4 step RACH i.e., in rach-ConfigCommon. If CB-PreamblesPerSSB4Step-SDT is not configured (in UL BWP on which UE transmits PRACH for small data transmission), the value of CB-PreamblesPerSSB4Step-SDT is equal to CB-PreamblesPerSSB configured for 4 step RACH i.e., in rach-ConfigCommon (in UL BWP on which UE transmits PRACH for small data transmission).

UE determines preambles for each SSB as follows:

If Y<1: Preambles starting from S to 'S+X−1' are used for small data transmission. In other words, X contention based preambles with consecutive indexes associated with the SSB per valid PRACH occasion start from S.

If Y>=1, X contention based preambles with consecutive indexes associated with SS/PBCH block n, 0≤n≤Y−1, per valid PRACH occasion start from preamble index 'S+n·$N_{preamble}^{total}$/Y, where $N_{preamble}^{total}$ is provided by totalNumberOfRA-Preambles-SDT. If totalNumberOfRA-Preambles-SDT is not configured, totalNumberOfRA-Preambles is used.

During the random access procedure initiated for small data transmission, for each random access attempt, UE first select SSB (SSB with highest SS-RSRP or SSB with SS-RSRP above a configured threshold or any SSB if there is no SSB with SS-RSRP above threshold) and then preamble and RO corresponding to selected SSB wherein preamble is selected from set of preambles as determined above. Mapping between ROs and SSBs is determined as in regular random access procedure. UE then transmit selected PRACH preamble and selected RO.

For small data transmission using 2 step RACH, following parameters are signaled by gNB. These parameters can be signaled in rach-ConfigCommon2Step-SDT IE or in rach-ConfigCommon2Step IE. These configurations are per UL BWP.

startingPreambleIndex2Step-SDT (S)
ssb-perRACH-Occasion2Step-SDT (Y)
CB-PreamblesPerSSB2Step-SDT (X)

If startingPreambleIndex2Step-SDT is not configured (i.e., not configured in UL BWP on which UE transmits PRACH for small data transmission), UE assumes startingPreambleIndex2Step-SDT is zero. Network may not configure startingPreambleIndex4Step-SDT if ROs for SDT are not shared with ROs for non SDT. If ssb-perRACH-Occasion2Step-SDT is not configured:

the value of ssb-perRACH-Occasion2Step-SDT is equal to ssb-perRACH-Occasion2step configured for 2 step RACH i.e. in rach-ConfigCommon2Step (of UL BWP on which UE transmits PRACH for small data transmission); the value of ssb-perRACH-Occasion2Step-SDT is equal to ssb-perRACH-Occasion configured for 4 step RACH i.e. in rach-ConfigCommon (of UL BWP on which UE transmits PRACH for small data transmission) if ssb-perRACH-Occasion2step is not configured (in UL BWP on which UE transmits PRACH for small data transmission).

If CB-PreamblesPerSSB2Step-SDT is not configured (i.e., not configured in UL BWP on which UE transmits PRACH for small data transmission), the value of CB-PreamblesPerSSB2Step-SDT is equal to CB-PreamblesPerSSB2Step configured for 2 step RACH i.e. in rach-ConfigCommon2Step (of UL BWP on which UE transmits PRACH for small data transmission); the value of CB-PreamblesPerSSB2Step-SDT is equal to CB-PreamblesPerSSB configured for 4 step RACH i.e. in rach-ConfigCommon (of UL BWP on which UE transmits PRACH for small data transmission) if CB-PreamblesPerSSB2Step is not configured (in UL BWP on which UE transmits PRACH for small data transmission).

UE determines preambles for each SSB as follows:

If Y<1: Preambles starting from S to 'S+X−1' are used for small data transmission. In other words, X contention based preambles with consecutive indexes associated with the SSB per valid PRACH occasion start from S.

If Y>=1, X contention based preambles with consecutive indexes associated with SS/PBCH block n, 0≤n≤Y−1, per valid PRACH occasion start from preamble index 'S+n·$N_{preamble}^{total}$/Y, where $N_{preamble}^{total}$ is provided by totalNumberOfRA-Preambles-2 step-SDT. If totalNumberOfRA-Preambles-2 step-SDT is not configured, totalNumberOfRA-2step-Preambles is used. If totalNumberOfRA-2step-Preambles is not configured totalNumberOfRA-Preambles is used.

During the random access procedure initiated for small data transmission, for each random access attempt UE first select SSB (SSB with highest SS-RSRP or SSB with SS-RSRP above a configured threshold or any SSB if there is no SSB with SS-RSRP above threshold) and then preamble and RO corresponding to selected SSB wherein preamble is selected from set of preambles corresponding to selected SSB as determined above. Mapping between ROs and SSBs is determined as in regular random access procedure. UE then transmit selected PRACH preamble and selected RO.

Figure 26:
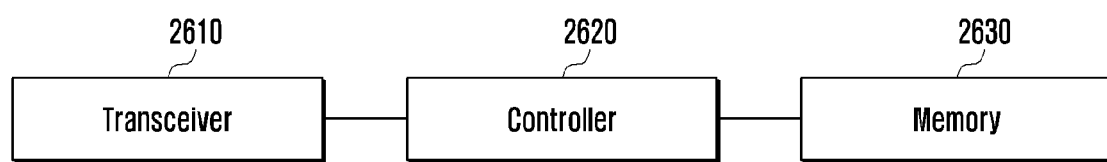
FIG. 26 is a block diagram of a terminal according to an embodiment of the disclosure.

FIG. 26 is a block diagram of a terminal according to an embodiment of the disclosure.

Referring to FIG. 26, a terminal includes a transceiver 2610, a controller 2620 and a memory 2630. The controller 2620 may refer to a circuitry, an ASIC, or at least one processor. The transceiver 2610, the controller 2620, and the memory 2630 are configured to perform at least one operation including a combination of steps, which are not in conflict, illustrated in at least one of the drawings or described above. Although the transceiver 2610, the controller 2620, and the memory 2630 are shown as separate entities, they may be realized as a single entity like a single chip. Alternatively, the transceiver 2610, the controller 2620, and the memory 2630 may be electrically connected to or coupled with each other.

The transceiver 2610 may transmit and receive signals to and from other network entities, e.g., a base station.

The controller 2620 may control the UE to perform functions according at least one operation described above.

In an embodiment, the operations of the terminal may be implemented using the memory 2630 storing corresponding program codes. Specifically, the terminal may be equipped with the memory 2630 to store program codes implementing desired operations. To perform the desired operations, the controller 2620 may read and execute the program codes stored in the memory 2630 by using a processor or a central processing unit (CPU).

Figure 27:
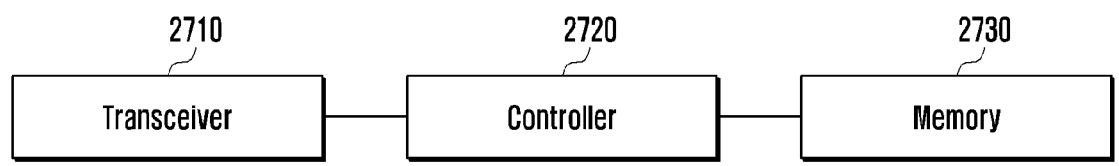
FIG. 27 is a block diagram of a base station according to an embodiment of the disclosure.

FIG. 27 is a block diagram of a base station according to an embodiment of the disclosure.

Referring to FIG. 27, a base station (BS) includes a transceiver 2710, a controller 2720 and a memory 2730. The controller 2720 may refer to a circuitry, an ASIC, or at least one processor. The transceiver 2710, the controller 2720 and the memory 2730 are configured to perform at least one operation including a combination of steps, which are not in conflict, illustrated in at least one of the drawings or described above. Although the transceiver 2710, the controller 2720, and the memory 2730 are shown as separate entities, they may be realized as a single entity like a single chip. Alternatively, the transceiver 2710, the controller 2720, and the memory 2730 may be electrically connected to or coupled with each other.

The transceiver 2710 may transmit and receive signals to and from other network entities, e.g., a terminal.

The controller 2720 may control the BS to perform functions according to at least one operation described above.

In an embodiment, the operations of the BS may be implemented using the memory 2730 storing corresponding program codes. Specifically, the BS may be equipped with the memory 2730 to store program codes implementing desired operations. To perform the desired operations, the controller 2720 may read and execute the program codes stored in the memory 2730 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal of a random access procedure for a small data transmission, the method comprising:

receiving, from a base station, at least one synchronization signal block (SSB);

identifying at least one preamble associated with the at least one SSB based on first information on a number of preambles per SSB and second information on a starting index, for one of a 4-step random access procedure or a 2-step random access procedure for the small data transmission;

selecting a preamble from the identified at least one preamble corresponding to an SSB selected from the at least one SSB; and transmitting, to a base station, the selected preamble in a physical random access channel (PRACH) occasion corresponding to the selected SSB.

2. The method of claim 1, further comprising:

identifying the second information on the starting index for one of the 4-step random access procedure or the 2-step random access procedure for the small data transmission.

3. The method of claim 2, wherein identifying the second information on the starting index comprises at least one of:

acquiring the second information based on a predetermined value for the 4-step random access procedure or the 2-step random access procedure for the small data transmission;

acquiring the second information based on third information indicating the starting index for the 4-step random access procedure or the 2-step random access procedure for the small data transmission;

acquiring the second information based on at least one of fourth information on a number of preambles per SSB for a normal 4-step random access procedure and fifth information on a number of preambles per SSB for a normal 2-step random access procedure; or in case that the random access procedure is the 2-step random access procedure for the small data transmission, acquiring the second information based on the fourth information, the fifth information and sixth information on the number of preambles per SSB for the 4-step random access procedure for the small data transmission.

4. The method of claim 3, wherein at least one of the first information, the third information, the fourth information, the fifth information and the sixth information is transmitted on a control message from the base station.

5. The method of claim 1, wherein, for identifying the at least one preamble, in case that a number of SSBs per PRACH occasion is less than 1, an index for the at least one preamble associated with the at least one SSB starts from S; and in case that the number of SSBs per PRACH occasion is greater than 1 or equal to 1, the index for the at least one preamble starts from $S+n \cdot N_{preamble}^{total}/Y$, wherein S is the starting index, n is an index of the at least one SSB, $N_{preamble}^{total}$ is a total number of preambles used for the random access procedure and Y is the number of SSB per PRACH occasion.

6. A method performed by a base station of a random access procedure for a small data transmission, the method comprising:

transmitting, to a terminal, at least one synchronization signal block (SSB); and receiving, from the terminal, a preamble for one of a 4-step random access procedure or a 2-step random access procedure for the small data transmission, in a physical random access channel (PRACH) occasion corresponding to an SSB among the at least one SSB, wherein at least one preamble associated with the at least one SSB is identified based on first information on a number of preambles per SSB and second information on a starting index for one of the 4-step random access procedure or the 2-step random access procedure for the small data transmission, and the preamble corresponding to the SSB is selected from the at least one preamble.

7. The method of claim 6, wherein the second information on the starting index is identified as:

acquiring the second information based on a predetermined value for the 4-step random access procedure or the 2-step random access procedure for the small data transmission;

acquiring the second information based on third information indicating the start index for the 4-step random access procedure or the 2-step random access procedure for the small data transmission;

acquiring the second information based on at least one of fourth information on a number of preambles per SSB for a normal 4-step random access procedure and fifth information on a number of preambles per SSB for a normal 2-step random access procedure; or in case that the random access procedure is the 2-step random access procedure for the small data transmission, acquiring the second information based on the fourth information, the fifth information and sixth information on the number of preambles per SSB for the 4-step random access procedure for the small data transmission.

8. The method of claim 7, wherein at least one of the first information, the third information, the fourth information, the fifth information and the sixth information is transmitted on a control message to the terminal.

9. The method of claim 6, wherein, in case that a number of SSBs per PRACH occasion is less than 1, an index for the at least one preamble associated with the at least one SSB starts from S; and in case that the number of SSBs per PRACH occasion is greater than 1 or equal to 1, the index for the at least one preamble starts from $S+n \cdot N_{preamble}^{total}/Y$, wherein S is the starting index, n is an index of the at least one SSB, $N_{preamble}^{total}$ is a total number of preambles used for the random access procedure and Y is the number of SSB per PRACH occasion.

10. A terminal of a random access procedure for a small data transmission, the terminal comprising:

a transceiver; and a controller coupled with the transceiver and configured to control to:

receive, from a base station, at least one synchronization signal block (SSB), identify at least one preamble associated with the at least one SSB based on first information on a number of preambles per SSB and second information on a starting index, for one of a 4-step random access procedure or a 2-step random access procedure for the small data transmission, selecting a preamble from the identified at least one preamble corresponding to an SSB selected from the at least one SSB, and transmit, to a base station, the selected preamble in a physical random access channel (PRACH) occasion corresponding to the selected SSB.

11. The terminal of claim 10, wherein the controller is further configured to control to:

identify the second information on the starting index for one of the 4-step random access procedure or the 2-step random access procedure for the small data transmission.

12. The terminal of claim 11, wherein, for identifying the second information, the controller is configured to control to perform at least one of:

acquiring the second information based on a predetermined value for the 4-step random access procedure or the 2-step random access procedure for the small data transmission, acquiring the second information based on third information indicating the start index for the 4-step random access procedure or the 2-step random access procedure for the small data transmission, acquiring the second information based on at least one of fourth information on a number of preambles per SSB for a normal 4-step random access procedure and fifth information on a number of preambles per SSB for a normal 2-step random access procedure, or in case that the random access procedure is the 2-step random access procedure for the small data transmission, acquiring the second information based on the fourth information, the fifth information and sixth information on the number of preambles per SSB for the 4-step random access procedure for the small data transmission.

13. The terminal of claim 12, wherein at least one of the first information, the third information, the fourth information, the fifth information and the sixth information is transmitted on a control message from the base station.

14. The terminal of claim 10, wherein, for identifying the at least one preamble,
in case that a number of SSBs per PRACH occasion is less than 1, an index for the at least one preamble associated with the at least one SSB starts from S; and
in case that the number of SSBs per PRACH occasion is greater than 1 or equal to 1, the index for the at least one preamble starts from $S+n \cdot N_{preamble}^{total}/Y$,
wherein S is the starting index, n is an index of the at least one SSB, $N_{preamble}^{total}$ is a total number of preambles used for the random access procedure and Y is the number of SSB per PRACH occasion.

15. A base station of a random access procedure for a small data transmission, the base station comprising:
a transceiver; and
a controller coupled with the transceiver and configured to control to:
transmit, to a terminal, at least one synchronization signal block (SSB), and
receive, from the terminal, a preamble for one of a 4-step random access procedure or a 2-step random access procedure for the small data transmission, in a physical random access channel (PRACH) occasion corresponding to an SSB among the at least one SSB, wherein at least one preamble associated with the at least one SSB is identified based on first information on a number of preambles per SSB and second information on a starting index for one of the 4-step random access procedure or the 2-step random access procedure for the small data transmission, and
the preamble corresponding to the SSB is selected from the at least one preamble.

16. The base station of claim 15, wherein the second information on the starting index is identified as:
acquiring the second information based on a predetermined value for the 4-step random access procedure or the 2-step random access procedure for the small data transmission, acquiring the second information based on third information indicating the start index for the 4-step random access procedure or the 2-step random access procedure for the small data transmission, acquiring the second information based on at least one of fourth information on a number of preambles per SSB for a normal 4-step random access procedure and fifth information on a number of preambles per SSB for a normal 2-step random access procedure, or in case that the random access procedure is the 2-step random access procedure for the small data transmission, acquiring the second information based on the fourth information, the fifth information and sixth information on the number of preambles per SSB for the 4-step random access procedure for the small data transmission.

17. The base station of claim 16, wherein at least one of the first information, the third information, the fourth information, the fifth information and the sixth information is transmitted on a control message to the terminal.

18. The base station of claim 15, wherein,
in case that a number of SSBs per PRACH occasion is less than 1, an index for the at least one preamble associated with the at least one SSB starts from S; and
in case that the number of SSBs per PRACH occasion is greater than 1 or equal to 1, the index for the at least one preamble starts from $S+n \cdot N_{preamble}^{total}/Y$,
wherein S is the starting index, n is an index of the at least one SSB, $N_{preamble}^{total}$ is a total number of preambles used for the random access procedure and Y is the number of SSB per PRACH occasion.

* * * * *